US012487461B2

(12) United States Patent
Jiang et al.

(10) Patent No.: US 12,487,461 B2
(45) Date of Patent: Dec. 2, 2025

(54) LENS MODULE AND HEAD-MOUNTED ELECTRONIC DEVICE

(71) Applicant: Huawei Technologies Co., Ltd., Shenzhen (CN)

(72) Inventors: Jun Jiang, Shenzhen (CN); Shuaishuai Zhu, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/647,237

(22) Filed: Apr. 26, 2024

(65) Prior Publication Data

US 2024/0272439 A1    Aug. 15, 2024

Related U.S. Application Data

(63) Continuation of application No. PCT/CN2022/111348, filed on Aug. 10, 2022.

(30) Foreign Application Priority Data

Oct. 28, 2021    (CN) .......................... 202111261479.0

(51) Int. Cl.
*G02B 27/01*    (2006.01)
*G02B 7/02*    (2021.01)
(Continued)

(52) U.S. Cl.
CPC ......... *G02B 27/0172* (2013.01); *G02B 7/022* (2013.01); *G02B 7/026* (2013.01); *G02B 27/0093* (2013.01); *G02B 27/0176* (2013.01); *G02B 27/0955* (2013.01); *G02B 27/0983* (2013.01); *G02B 2027/0138* (2013.01)

(58) Field of Classification Search
CPC ............ G02B 27/0093; G02B 27/0172; G02B 27/0176; G02B 27/0955; G02B 27/0983; G02B 7/021; G02B 7/022; G02B 7/026; G02B 2027/0138; G02B 2027/0178
See application file for complete search history.

(56) References Cited

U.S. PATENT DOCUMENTS 10,585,477 B1    3/2020    Cavin et al.
2019/0253700 A1    8/2019    Torneus et al.
(Continued)

FOREIGN PATENT DOCUMENTS

CN    103748598 A    4/2014
CN    206178658 U    5/2017
(Continued)

*Primary Examiner* — Nelson M Rosario
(74) *Attorney, Agent, or Firm* — Slater Matsil, LLP

(57) ABSTRACT

A lens module and a head mounted electronic device are provided, where the lens module includes a light emitting unit, a lens barrel, and an eye camera. The light emitting unit is disposed at an end of the lens barrel. The lens module further includes a hollow mounting stage, where the mounting stage is connected to the lens barrel, a cavity of the mounting stage communicates with an inner cavity of the lens barrel, and an optical axis of the eye camera is inclined to an axial direction of the lens barrel. The lens module helps implement an eye tracking function of VR glasses based on a folded optical path, and helps reduce impact of the eye tracking function on imaging quality of the lens module.

19 Claims, 20 Drawing Sheets

(51) Int. Cl.
*G02B 27/00* (2006.01)
*G02B 27/09* (2006.01)

(56) References Cited

U.S. PATENT DOCUMENTS

| | | | |
|---|---|---|---|
| 2020/0051320 A1 | 2/2020 | Laffont et al. | |
| 2020/0124857 A1* | 4/2020 | Bierhuizen | G02B 27/0093 |
| 2020/0285307 A1* | 9/2020 | Price | G06F 3/013 |
| 2022/0229298 A1* | 7/2022 | Song | H04N 13/383 |

FOREIGN PATENT DOCUMENTS

| | | |
|---|---|---|
| CN | 107562184 A | 1/2018 |
| CN | 207408689 U | 5/2018 |
| CN | 108535866 A | 9/2018 |
| CN | 110168428 A | 8/2019 |
| CN | 110646912 A | 1/2020 |
| CN | 211454097 U | 9/2020 |
| CN | 211698362 U | 10/2020 |
| CN | 213934926 U | 8/2021 |

\* cited by examiner

LENS MODULE AND HEAD-MOUNTED ELECTRONIC DEVICE

CROSS-REFERENCE TO RELATED APPLICATIONS

This application is a continuation of International Application No. PCT/CN2022/111348, filed on Aug. 10, 2022, which claims priority to Chinese Patent Application No. 202111261479.0, filed on Oct. 28, 2021. The disclosures of the aforementioned applications are hereby incorporated by reference in their entireties.

TECHNICAL FIELD

This application relates to the field of head-mounted electronic devices, and specifically, to a lens module and a head-mounted electronic device.

BACKGROUND

Virtual reality (VR) glasses are a virtual reality head-mounted display device. Eye tracking is a key feature function of a virtual reality device, an augmented reality (AR) device, a mixed reality (MR) device, and a substitutional reality device.

In a VR optical system designed by using an optical path folding method, a size of glasses and a thickness of a lens barrel are both small, and therefore, user experience is good. Currently, a structural solution for eye tracking requires that there is sufficient space inside the lens barrel to dispose a hot mirror. However, this structural solution is not applicable to VR glasses that are based on a folded optical path and that have a small lens barrel thickness. Therefore, it is necessary to design a structural solution for a VR optical system based on a folded optical path, to implement an eye tracking function of such VR glasses.

SUMMARY

This application provides a lens module and a head-mounted electronic device, to implement an eye tracking function of VR glasses based on a folded optical path.

According to a first aspect, a lens module is provided, including a light emitting unit, a lens barrel, and an eye camera.

The light emitting unit is disposed at one end of the lens barrel.

The lens module further includes a hollow mounting stage, where the mounting stage is connected to the lens barrel, a cavity of the mounting stage communicates with an inner cavity of the lens barrel, and an optical axis of the eye camera is inclined to an axial direction of the lens barrel.

The eye camera is disposed at an end that is of the mounting stage and that is away from the lens barrel, and extends into the cavity.

In a possible implementation, the lens module is a lens module based on a folded optical path.

According to the lens module provided in embodiments of this application, the inner cavity of the lens barrel communicates with the outside of the lens barrel by using a method for forming an opening on the inner cavity of the lens barrel. In this way, the eye camera disposed outside the lens barrel can receive infrared light that is from the inner cavity of the lens barrel and that is reflected by a human eye, thereby implementing eye tracking without occupying internal space of the lens barrel, and saving the internal space of the lens barrel. In addition, it is more convenient to disassemble and repair the eye camera mounted outside the lens barrel, which facilitates subsequent product repair and maintenance by a user.

With reference to the first aspect, in some implementations of the first aspect, the eye camera receives light that is from the light emitting unit and that passes through the inner cavity of the lens barrel after being reflected by a human eye.

According to the lens module provided in embodiments of this application, infrared light that is emitted by the light emitting unit and that is used to implement eye tracking is reflected into the inner cavity of the lens barrel through the human eye, and then is emitted into the eye camera after passing through the inner cavity of the lens barrel. This implements an eye tracking function of the lens module. In this way, the infrared light emitted by the light emitting unit is emitted into the eye camera based on a preset optical path, and the lens module further parses the captured infrared light to determine an action of the human eye. This helps determine a mutual position relationship between components of the lens module, thereby facilitating design and mounting of the lens module and a device for mounting the lens module, facilitating maintenance and protection in a product use process, and improving user experience.

With reference to the first aspect, in some implementations of the first aspect, the lens module further includes a fixed lens element, the fixed lens element includes a first fixed lens element and a second fixed lens element, an inner cavity opening of the lens barrel is located between the first fixed lens element and the second fixed lens element, and the cavity of the mounting stage communicates with the inner cavity of the lens barrel at the inner cavity opening.

According to the lens module provided in embodiments of this application, the inner cavity opening of the lens barrel is provided on a lens barrel wall spaced between the first fixed lens element and the second fixed lens element. On the premise of securely mounting a lens element inside the lens barrel, a larger inner cavity opening is provided as much as possible, so that more sufficient infrared light is emitted into the eye camera, an action of the human eye is efficiently and accurately reflected, and mounting of the lens element in the lens barrel is not affected.

With reference to the first aspect, in some implementations of the first aspect, the lens module further includes a lens element holder, the lens barrel further includes a fitting part, the fitting part is located at the other end that is of the lens barrel and that is opposite to the light emitting unit, and the lens element holder is sleeved on the fitting part and is capable of moving along the fitting part in the axial direction of the lens barrel.

The mounting stage is located on a lens barrel outer wall of the lens barrel wall spaced between the light emitting unit and the fitting part.

According to the lens module provided in embodiments of this application, the lens element holder is sleeved on the lens barrel, and is capable of moving in the axial direction of the lens barrel. When lens elements are disposed on the lens element holder, distances between different lens elements may be changed, to implement a focus adjustment function of the lens module. In addition, because the mounting stage is disposed at an end away from the lens element holder, the infrared light reflected by the human eye is emitted into the eye camera on the mounting stage without passing through the lens element holder that may move. In other words, the lens module provided in embodiments of this application implements a focus adjustment function without changing an optical path implemented by the eye tracking function. An imaging function of the lens module is decoupled from the eye tracking function. This can improve product use experience of the user and facilitate subsequent maintenance of the lens module.

With reference to the first aspect, in some implementations of the first aspect, the eye camera faces away from the light emitting unit, the lens module further includes a mirror reflector, and the mirror reflector is disposed in the cavity, or disposed at a joint between the cavity and the inner cavity of the lens barrel.

The light from the light emitting unit is incident to the mirror reflector through the inner cavity of the lens barrel, and light reflected by the mirror reflector is emitted into the eye camera.

According to the lens module provided in embodiments of this application, a mirror reflector is disposed on an optical path through which the infrared light is incident to the eye camera, and an optical path of the infrared light is adjusted. This helps provide more feasible structural solutions for eye tracking.

The mirror reflector is disposed at the cavity of the mounting stage or at the joint between the cavity of the mounting stage and the inner cavity of the lens barrel, and the mirror reflector that is configured to adjust the optical path of the infrared light is not disposed on a visible light optical path used by the lens module for imaging, so that adverse impact of the mirror reflector on imaging of the lens module is reduced, and user experience is improved.

With reference to the first aspect, in some implementations of the first aspect, an included angle between the optical axis of the eye camera and the axial direction of the lens barrel is 20° to 70°.

According to the lens module provided in embodiments of this application, a more precise range of an inclination angle between the optical axis of the eye camera and the axial direction of the lens barrel is provided. The inclination angle within the range helps the eye camera capture the infrared light reflected by the human eye, and facilitates achievement of the eye tracking function.

With reference to the first aspect, in some implementations of the first aspect, the mirror reflector is any one of a planar mirror reflector, a concave mirror reflector, or a convex mirror reflector.

According to the lens module provided in embodiments of this application, an optical path of the infrared light for eye tracking may be adjusted by disposing different types of mirror reflectors, so as to implement the eye tracking function of the lens module in different scenarios (such as a light source and an environment).

With reference to the first aspect, in some implementations of the first aspect, the planar mirror reflector is disposed vertically to the axial direction of the lens barrel, or a principal axis of the concave mirror reflector or the convex mirror reflector is disposed in parallel with the axial direction of the lens barrel.

The lens module provided in embodiments of this application facilitates design of a structural solution of the lens module, facilitates mounting of the mirror reflector, facilitates further parsing of the infrared light after the eye camera captures the infrared light, and facilitates achievement of the eye tracking function of the lens module.

With reference to the first aspect, in some implementations of the first aspect, the lens module further includes an adjustment support, where the adjustment support is sleeved on the lens element holder and is rotatably connected to the lens element holder, and the adjustment support pushes the lens element holder to move in the axial direction of the lens barrel.

According to the lens module provided in embodiments of this application, the adjustment support may rotate to drive the lens element holder to move in the axial direction of the lens barrel, to facilitate achievement of a focus adjustment function of the lens module.

With reference to the first aspect, in some implementations of the first aspect, the adjustment support is provided with a guide rail, the guide rail extends around a periphery of the lens barrel in the axial direction of the lens barrel, an outer wall of the lens element holder is provided with a sliding block, and when the sliding block slides in the guide rail, the lens element holder moves in the axial direction of the lens barrel and rotates in a circumferential direction of the lens barrel.

According to the lens module provided in embodiments of this application, a structure of a sliding guide rail is formed through structural designs of the lens element holder and the adjustment support, and a position of the lens element holder in the axial direction of the lens barrel is changed by moving the sliding block on the guide rail, so that a focal length of the lens module is adjusted. An adjustment structure of the sliding guide rail helps stabilize the focal length of the lens module.

With reference to the first aspect, in some implementations of the first aspect, the eye camera faces the light emitting unit and receives the light from the human eye, and an included angle between the optical axis of the eye camera and the axial direction of the lens barrel is 0° to 70°.

According to the lens module provided in embodiments of this application, the eye camera faces the light emitting unit, and can directly receive the infrared light reflected by the human eye without adjusting the optical path of the infrared light by using the mirror reflector. This helps reduce a size of the mounting stage and improve user experience.

According to the lens module provided in embodiments of this application, a more precise range of an inclination angle between the optical axis of the eye camera and the axial direction of the lens barrel is provided. The inclination angle within the range helps the eye camera capture the infrared light reflected by the human eye, and facilitates achievement of the eye tracking function of the lens module.

With reference to the first aspect, in some implementations of the first aspect, the lens module further includes a sealing cover, the lens barrel further includes a window, and the sealing cover is in a sealed connection to the window.

According to the lens module provided in embodiments of this application, the sealing cover corresponding to the window of the lens barrel is disposed, and the sealing cover is in the sealed connection to the window. This helps reduce a possibility that dust, particles, and the like outside the lens barrel enter the lens barrel from the window of the lens barrel, improve sealing of the lens module, protect a lens element inside the lens barrel, and prolong a service life of the lens module.

With reference to the first aspect, in some implementations of the first aspect, the lens element holder is provided with a first protrusion structure corresponding to the window, the first protrusion structure is disposed outside the window, and the sealing cover covers the first protrusion structure and is in a sealed connection to the window.

According to the lens modules provided in embodiments of this application, the first protrusion structure corresponding to the window of the lens barrel is disposed on the lens element holder, and the first protrusion structure is disposed outside the window of the lens barrel, to protect an eye camera disposed in the window of the lens barrel. The sealing cover covers the first protrusion structure, and may further be in a sealed connection to the first protrusion mechanism. This helps reduce a possibility that dust, particles, and the like outside the lens barrel enter the lens barrel from the first protrusion structure, improve sealing of the lens module, protect a lens element inside the lens barrel, and prolong a service life of the lens module.

With reference to the first aspect, in some implementations of the first aspect, the lens module further includes an adjustment support, where the adjustment support is provided with a second protrusion structure corresponding to the first protrusion structure, the second protrusion structure is disposed outside the first protrusion structure, the first protrusion structure is provided with a sliding block, and the second protrusion structure is provided with a guide rail corresponding to the sliding block on the first protrusion structure.

The sealing cover covers the first protrusion structure and is separately in a sealed connection to the window and the second protrusion structure.

According to the lens module provided in embodiments of this application, the second protrusion structure corresponding to the first protrusion structure is disposed on the adjustment support, and the second protrusion structure is disposed outside the first protrusion structure. This helps protect an eye camera disposed in the window of the lens barrel. The second protrusion structure is in the sealed connection to the sealing cover, which helps reduce a possibility that dust, particles, and the like outside the lens barrel enter the lens barrel from the adjustment support, improve sealing of the lens module, protect a lens element inside the lens barrel, and prolong a service life of the lens module.

The sliding block and the guide rail are respectively disposed at positions corresponding to the first protrusion structure and the second protrusion structure. In a rotation process of the adjustment support, the protrusion structure can also rotate and move stably, so that stability of the lens module during use and user experience can be improved.

With reference to the first aspect, in some implementations of the first aspect, the adjustment support may alternatively be a threaded transmission structure or a gear transmission structure.

According to the lens module provided in embodiments of this application, a focal length of the lens module may be adjusted by using the threaded transmission structure or the gear transmission structure.

With reference to the first aspect, in some implementations of the first aspect, there are a plurality of light emitting units.

According to the lens module provided in embodiments of this application, the plurality of light emitting units are disposed, so that sufficient infrared light is incident to the human eye, and sufficient infrared light is emitted to the eye camera after being reflected by the human eye. This facilitates achievement of the eye tracking function of the lens barrel module.

With reference to the first aspect, in some implementations of the first aspect, the plurality of light emitting units are evenly distributed around the axial direction of the lens barrel.

According to the lens module provided in embodiments of this application, the plurality of light emitting units are evenly distributed around the axial direction of the lens barrel, so that sufficient infrared light is incident to the human eye, and sufficient infrared light is emitted to the eye camera after being reflected by the human eye. This facilitates achievement of the eye tracking function of the lens barrel module.

With reference to the first aspect, in some implementations of the first aspect, the lens module further includes a lens mount, and the light emitting unit is disposed on the lens mount.

According to the lens module provided in embodiment of this application, the infrared light emitting unit is disposed on the lens mount, which facilitates mounting and dismounting of the light emitting unit, facilitates maintenance of the lens module by the user, and improves user experience.

According to a second aspect, a lens module is provided, including a light emitting unit, a lens mount, a lens barrel, and an eye camera.

The lens mount is disposed at an end of the lens barrel, and the light emitting unit is disposed on a side that is of the lens mount and that is away from the lens barrel.

The lens module further includes a hollow mounting stage, where the mounting stage is connected to the lens mount, and an optical axis of the eye camera is inclined to an axial direction of the lens barrel.

The eye camera is disposed on a side that is of the mounting stage and that is away from the axial direction of the lens barrel, and extends into a cavity.

According to the lens module provided in embodiments of this application, the mounting stage and the eye camera are disposed on the lens mount close to a human eye, to avoid forming an opening on an inner cavity of the lens barrel, reduce complexity of a lens module structure, facilitate mounting and maintenance of the lens module, reduce space occupation in the lens barrel, reduce impact of an eye tracking function on an imaging function of the lens module, and improve user experience.

With reference to the second aspect, in some implementations of the second aspect, the eye camera receives light that is from the light emitting unit and that is reflected by a human eye.

According to the lens module provided in embodiments of this application, infrared light that is emitted by the light emitting unit and that is used to implement eye tracking is emitted into the eye camera after being reflected by the human eye. This implements an eye tracking function of the lens module. In this way, the infrared light emitted by the light emitting unit is emitted into the eye camera based on a preset optical path, and the lens module further parses the captured infrared light to determine an action of the human eye. This helps determine a mutual position relationship between components of the lens module, thereby facilitating design and mounting of the lens module and a device for mounting the lens module, facilitating maintenance and protection in a product use process, and improving user experience.

With reference to the second aspect, in some implementations of the second aspect, the mirror reflector is any one of a planar mirror reflector, a concave mirror reflector, or a convex mirror reflector, and the planar mirror reflector is inclined to the optical axis of the eye camera, or a principal axis of the concave mirror reflector or the convex mirror reflector is inclined to the optical axis of the eye camera.

According to the lens module provided in embodiments of this application, an optical path of the infrared light for eye tracking may be adjusted by disposing different types of mirror reflectors, so as to implement the eye tracking function of the lens module in different scenarios (such as a light source and an environment).

With reference to the second aspect, in some implementations of the second aspect, the lens module further includes a first fixed lens element and a mirror reflector.

The first fixed lens element is fastened in the lens barrel, and a surface that is of the first fixed lens element and that is close to the lens mount is provided with a reflective film.

The mounting stage includes a body and a boss, the boss extends from the body to an inner cavity of the lens barrel, the body includes a cavity, the eye camera is disposed in the cavity of the body, the mirror reflector is disposed on the boss, the mirror reflector is disposed facing a fixed lens element, and the mirror reflector is inclined to the optical axis of the eye camera.

The light from the light emitting unit is emitted into an emitting film after being reflected by the human eye, light reflected by the reflective film is incident to the mirror reflector, and light reflected by the mirror reflector is emitted into the eye camera.

According to the lens module provided in embodiments of this application, the mirror reflector is disposed on the boss of the mounting stage, and the surface that is of the fixed lens element and that is close to the light emitting unit is provided with the reflective film. An optical path of the infrared light is adjusted by using the reflective film and the mirror reflector, and the infrared light that is emitted by the light emitting unit and that it used to implement eye tracking is reflected into the inner cavity of the lens barrel through the human eye, is emitted into the mirror reflector through the reflective film in the inner cavity of the lens barrel, and is emitted into the eye camera after being reflected by the mirror reflector. This helps reduce space occupation in the lens barrel, helps reduce impact of the eye tracking function on an imaging function of the lens module, and helps improve user experience.

With reference to the second aspect, in some implementations of the second aspect, the first fixed lens element is disposed at an end that is in the lens barrel and that is away from the lens mount.

The lens module further includes an adjustment support and a lens element holder, where the lens element holder is sleeved at an end that is outside the lens barrel and that is away from the first fixed lens element, and is disposed opposite to the lens mount. The adjustment support is rotatably connected to the lens element holder, and is configured to adjust a position of the lens element holder in the axial direction of the lens barrel.

According to the lens module provided in embodiments of this application, the lens element holder may be configured to fasten a lens element inside the lens barrel. The adjustment support is rotatably connected to the lens element holder, and is configured to adjust a position of the lens element holder in the axial direction of the lens barrel, to change a relative distance between different lens elements inside the lens barrel, so as to implement a focus adjustment function of the lens module. Because the lens element holder is disposed at an end away from the fixed lens element on which the reflective film is disposed, when a position of the lens element holder changes, an optical path of the infrared light for implementing the eye tracking function is not changed. An imaging function of the lens module is decoupled from the eye tracking function, which can improve product use experience of the user and facilitate subsequent maintenance of the lens module.

With reference to the second aspect, in some implementations of the second aspect, an included angle between the optical axis of the eye camera and the axial direction of the lens barrel is 45° to 90°.

According to the lens module provided in embodiments of this application, a more precise range of an inclination angle between the optical axis of the eye camera and the axial direction of the lens barrel is provided. The inclination angle within the range helps the eye camera capture the infrared light reflected by the human eye, and facilitates achievement of the eye tracking function.

With reference to the second aspect, in some implementations of the second aspect, the lens module further includes a transparent snap ring. The transparent snap ring is disposed outside the lens barrel, and the light from the light emitting unit is emitted into the human eye through the transparent snap ring.

According to the lens module provided in embodiments of this application, the transparent snap ring is disposed outside the mounting stage and the lens barrel, to protect an element of the lens module. The transparent snap ring can also be used for decoration to a specific extent, thereby improving user experience.

With reference to the second aspect, in some implementations of the second aspect, a side that is of the mounting stage and that is close to the inner cavity of the lens barrel extends in the axial direction of the lens barrel, and forms a lens element support with the lens mount.

The lens module further includes a first fixed lens element, and the first fixed lens element is fastened in the lens barrel by using the lens element support.

According to the lens module provided in embodiments of this application, the mounting stage and the lens mount form the lens element support, and the mounting stage disposed on the lens mount is effectively used. This help improve utilization of internal space of the lens module, and reduce adverse impact of the eye tracking function on another function like the imaging function of the lens module.

With reference to the second aspect, in some implementations of the second aspect, the adjustment support is any one of the following adjustment structures: a sliding guide rail structure, a threaded transmission structure, and a gear transmission structure.

According to the lens module provided in embodiments of this application, a component configured to implement the eye tracking function is separated from the lens barrel. A functional structure of the lens barrel, for example, the adjustment support, does not affect achievement of the eye tracking function. This facilitates mounting and maintenance of the lens module, and helps improve user experience.

With reference to the second aspect, in some implementations of the second aspect, there are a plurality of light emitting units.

According to the lens module provided in embodiments of this application, the plurality of light emitting units are disposed, so that sufficient infrared light is incident to the human eye, and sufficient infrared light is emitted to the eye camera after being reflected by the human eye. This facilitates achievement of the eye tracking function of the lens barrel module.

With reference to the second aspect, in some implementations of the second aspect, the plurality of light emitting units are evenly distributed on the lens mount around the axial direction of the lens barrel.

According to the lens module provided in embodiments of this application, the light emitting units are evenly distributed around the axial direction of the lens barrel, so that sufficient infrared light is incident to the human eye, and sufficient infrared light is emitted to the eye camera after being reflected by the human eye. This facilitates achievement of the eye tracking function of the lens barrel module.

According to a third aspect, a head-mounted electronic device is provided, including a lens frame and the lens module according to any one of the first aspect or the second aspect, where the lens module is disposed on the lens frame.

DETAILED DESCRIPTION OF ILLUSTRATIVE EMBODIMENTS

Figure 1:
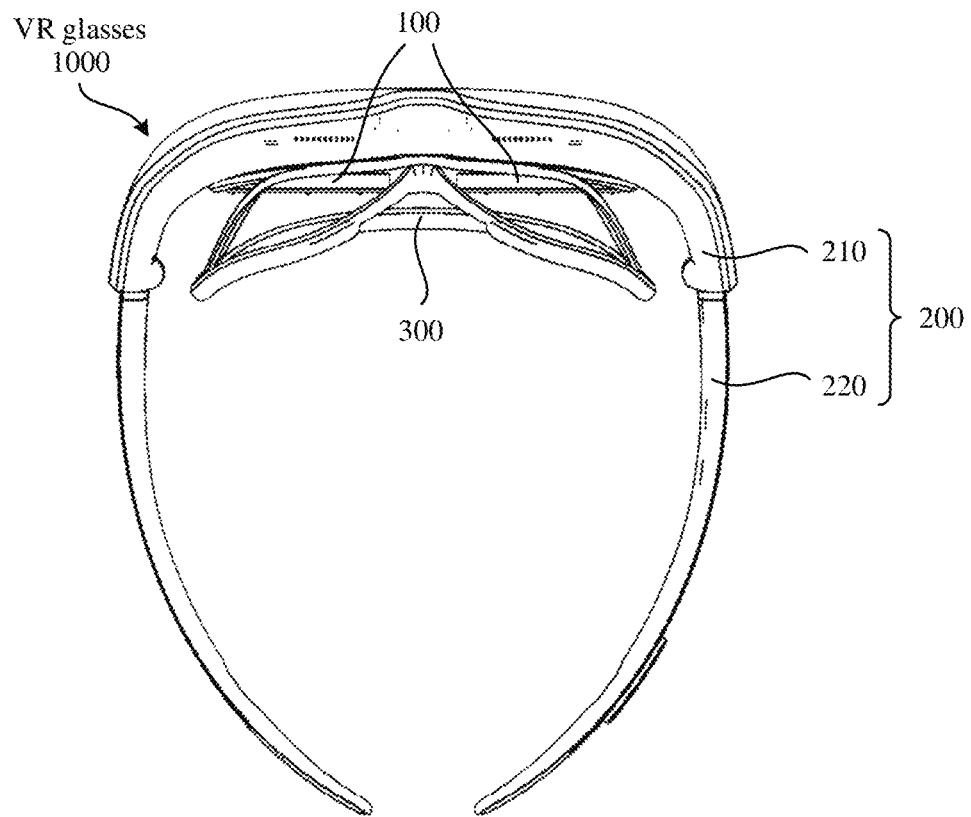
FIG. 1 is a diagram of a structure of VR glasses according to an embodiment of this application.

The following describes technical solutions of this application with reference to accompanying drawings. It is clear that the described embodiments are merely some but not all of embodiments of this application.

The following terms "first", "second", and the like are merely intended for a purpose of description, and shall not be understood as an indication or implication of relative importance or implicit indication of a quantity of indicated technical features. Therefore, a feature limited by "first", "second", or the like may explicitly or implicitly include one or more features.

The term "and/or" in embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the descriptions of embodiments of this application, it should be noted that terms "mounting" and "connection" should be understood in a broad sense unless there is a clear stipulation and limitation. For example, the "connection" may be a detachable connection, an un-detachable connection, a direct connection, or an indirect connection through an intermediate medium. In addition, in this application, directional terms such as "center", "up", "down", "inside", "outside", "front", and "rear" are defined relative to directions or positions of components schematically placed in the accompanying drawings. It should be understood that these directional terms are relative concepts and are used for relative description and clarification, and are not used to indicate or imply that an indicated apparatus or component needs to have a specified direction or be constructed and operated in a specified direction. The terms may change accordingly with directions in which components in the accompanying drawings are placed, and therefore cannot be construed as a limitation of this application. "A plurality of" means at least two.

Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "comprise", "have", and their variants all mean "include but are not limited to", unless otherwise specifically emphasized in another manner.

For ease of understanding, the following first explains and describes related technical terms in embodiments of this application.

Optical axis: The optical axis refers to a direction in which a light ray is transmitted in an optical system, with a main light ray in a center field of view as reference. For a symmetric transmission system, the optical axis generally coincides with a rotation center line of the optical system.

Focus: The focus refers to a convergence point of light rays that are parallel to the optical axis and that are refracted by a lens.

Focal length: The focal length, also referred to as a focal length, is a manner for measuring light convergence or divergence in the optical system, and is a distance from an optical center of the lens to the focus when an object at infinity is imaged to form a clear image on a focal plane through the lens. For a fixed focus lens, a position of an optical center of the fixed focus lens is fixed, and therefore, a focal length is fixed. But for a zoom lens, a change of an optical center of the lens brings about a change of a focal length of the lens, and therefore, a focal length is adjustable.

Diopter: The diopter is a unit that measures a refractive capability of the lens or a curved mirror. A reciprocal of the focal length is referred to as dioptric power of the lens, or diopter. Generally, a degree is used to identify the diopter of glasses. A value of the diopter is multiplied by 100 as the degree.

Axial direction: Generally, for a cylinder-like object, the axial direction is a direction of a rotation central axis of a cylinder, namely, a direction in an axial direction of the cylinder.

Radial direction: Generally, for a cylinder-like object, the radial direction is perpendicular to the axial direction, and is a radius or diameter direction of an end face circle of a cylinder.

Circumferential direction: Generally, for a cylinder-like object, the circumferential direction is a direction of a circumference of a cylinder, namely, a direction around an axial direction of the cylinder.

End face: The end face is plane at each of both ends of a cylindrical component.

Infrared (IR): The infrared is an electromagnetic wave whose frequency is between that of microwave and that of visible light, and whose wavelength ranges from 760 nm to 1 mm. The infrared is invisible light whose wavelength is longer than that of red light.

Eye tracking: The eye tracking refers to tracking an eye motion by measuring a position of an eye gaze point or a motion of an eyeball relative to a head. Specifically, an image processing technology is used by an instrument to locate a position of a through hole, obtain coordinates, and calculate a point at which the glasses gaze or stare by using a specific algorithm. Currently, there are a plurality of eye tracking methods, and a most common non-invasive means is to obtain a position of the glasses by using a video shooting device. A basic principle of the most common non-invasive means is as follows: A beam of light and a video camera are aligned to eyes of a tested object, and a direction at which the tested object gazes is inferred through the light and back-end analysis. The video camera records an interaction process.

Angle of view: In photography, the angle of view is an angle range within which a camera can receive an image in a general environment, and may also be referred to as a field of view.

Hot mirror: The hot mirror is a special dielectric mirror, is a dichroic filter, and is generally configured to protect the optical system, reflect infrared light back to a light source, and allow visible light to pass through.

Principal axis: The principal axis is also referred to as a principal optical axis, which is a straight line that passes through a center of the curved mirror and is perpendicular to a mirror surface.

Reflective film: The reflective film is coated on a surface of an optical device, to increase reflectivity of the surface of the optical device to light within a specific wavelength range.

With reference to the accompanying drawings, the following describes in detail a structure of a lens module provided in embodiments of this application, namely, a method for eye tracking by the lens module.

FIG. 1 is a diagram of a structure of VR glasses according to an embodiment of this application.

Refer to FIG. 1. VR glasses 1000 include a lens frame 200 and a lens module 100. The lens frame 200 may provide support and space for disposing the lens module 100, and may also be convenient for a user to carry and use. The lens module 100 may provide a virtual reality image for the user.

In the following embodiments, only VR glasses are used as an example to describe a structure and function achievement of the lens module 100. It should be understood that the lens module 100 provided in embodiments of this application may be further applied to an MR device, a VR device, and an AR device.

The lens frame 200 may include a rim 210 and frame temples 220 disposed on two sides of the rim 210. The lens module 100 is disposed on the rim 210, and the frame temples 220 are convenient for the user to wear. The VR glasses may further include an eye mask 300, and the eye mask 300 is located on sides that are of the rim 210 and that are close to the frame temples 220. In this embodiment of this application, an end that is close to a human eye and that is in an axial direction of the lens module 100 is a rear end of the lens module 100. An end away from the human eye, namely, an end close to a display, is a front end of the lens module 100.

In some embodiments, the VR glasses may further include another device structure, for example, a circuit board, a chip, or a controller, to implement a function of the VR glasses.

In an existing virtual reality device, the lens module further includes a display, and the display is configured to present a VR resource to eyes of the user. However, there is a range for the human eye to obtain a clear image. When the virtual reality device is worn, a distance between the display and the human eye is far less than a visible distance. For example, after the VR glasses are worn, the display is usually only 30 mm to 50 mm away from the eye. Therefore, the lens module generally further includes a lens element assembly. The lens element assembly generally includes one or more lens elements (such as a lens). The lens element assembly is disposed between the display and the eye of the user, and is configured to enable an image on the display to form a larger and farther virtual image, so that the virtual image can fall within a range that can be effectively viewed by the human eye. This facilitates viewing experience of the user.

A principle of eye tracking is as follows: Multi-angle and multi-beam infrared light is emitted from a light source to the human eye, reflected by the human eye, and then captured by an eye camera to obtain an eyeball motion state, so that an eye tracking feature function is implemented. Currently, in an eye tracking method, a plurality of infrared light emitting diodes are disposed on an outer ring of a near-eye lens element. After the infrared light emitting diodes are turned on, infrared light is emitted into the eye, and infrared light reflected by the eye is reflected by a hot mirror through a VR lens element to enter the eye camera, to achieve an effect of capturing an action of an eyeball. In this eye tracking technical solution, space inside the lens barrel should be sufficient for placing the hot mirror that is used to adjust an optical path of the infrared light, to meet a reflection angle requirement, and brightness of an image seen by the human eye is accordingly reduced due to impact of the hot mirror.

Figure 2:
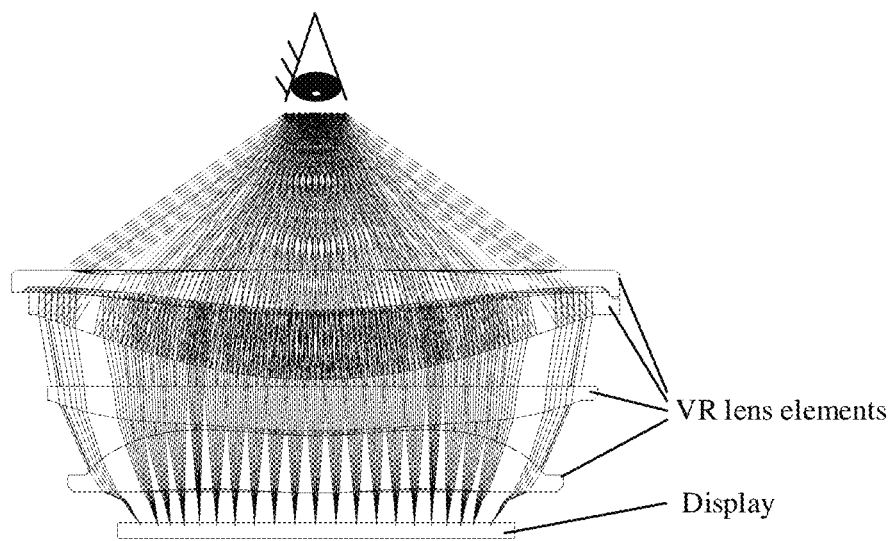
FIG. 2 is a diagram of a visible light optical path of a lens module according to an embodiment of this application.

FIG. 2 is a diagram of a visible light optical path of a lens module of VR glasses according to an embodiment of this application. A display is used as a visible light source of the VR glasses and is configured to emit visible light. The visible light emitted by the display passes through a VR lens element (a fixed lens element and/or moveable lens element) in the lens module and then enters a human eye. An optical path of the visible light is adjusted by adjusting parameters such as a quantity of lens elements of the VR lens element in the lens module, and curvatures, concave-convex shapes, thicknesses, and the like of different lens elements, to implement folding of the optical path and converge the visible light to the human eye.

Space between the VR lens elements shown in FIG. 2 is narrow, and it is difficult to dispose a hot mirror. In addition, disposing an element like a hot mirror on the visible light optical path brings adverse impact on propagation of the visible light, and further affects a display effect of the VR glasses and compromises user experience.

Therefore, in an eye tracking structural solution designed for a VR optical system based on a folded optical path, limited space inside the lens barrel needs to be effectively used to enable the eye camera to capture infrared light reflected by the human eye. In addition to this, impact on a presentation effect of the display should be further avoided as much as possible.

The following describes the lens module in embodiments of this application in detail with reference to specific implementations and accompanying drawings.

Figure 3:
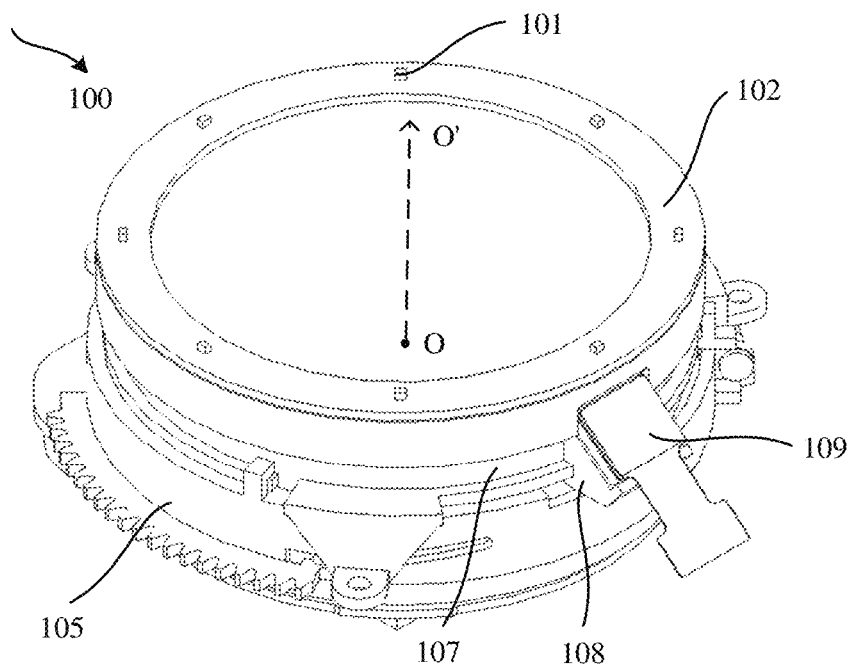
FIG. 3 is an isometrical diagram of a lens module according to an embodiment of this application.
Figure 4:
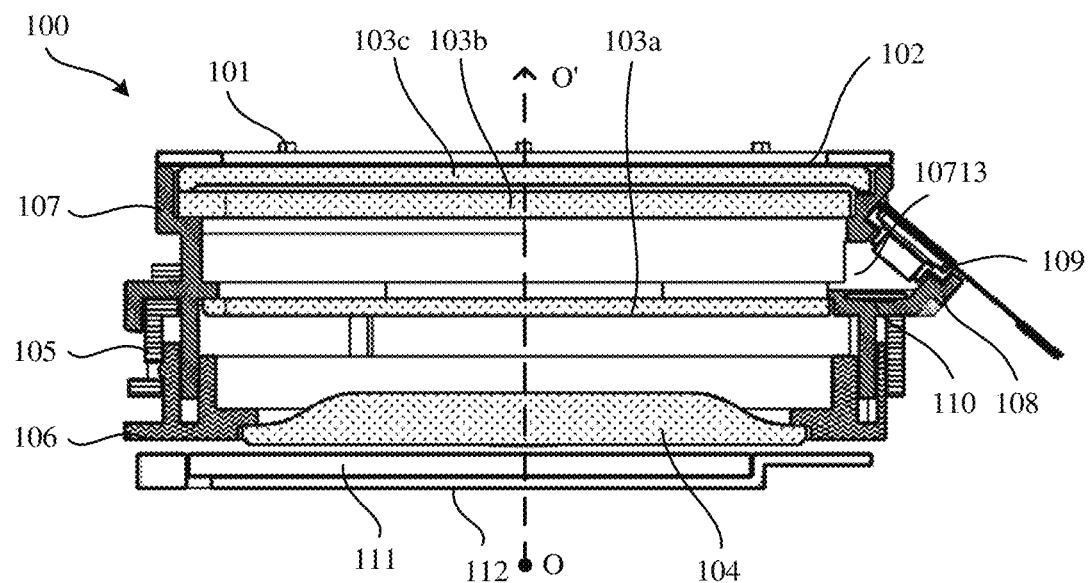
FIG. 4 is a diagram of a cross section of a lens module according to an embodiment of this application.

FIG. 3 is a diagram of a structure of a lens module according to an embodiment of this application. FIG. 4 is a sectional view of the lens module shown in FIG. 3. FIG. 5 to FIG. 9 are diagrams of components forming a lens module.

Refer to FIG. 3 and FIG. 4. The lens module 100 provided in embodiments of this application includes an infrared light emitting unit 101, a mounting stage 108, an eye camera 109, and a hot mirror 110. The infrared light emitting unit 101, the eye camera 109, and the hot mirror 110 are configured to implement an eye tracking function. The infrared light emitting unit 101 is an infrared light source and is configured to emit infrared light. The hot mirror 110 is configured to adjust an optical path of the infrared light. The eye camera 109 is configured to: capture infrared light reflected by a human eye, parse the infrared light captured by the eye camera 109, and determine an action of the human eye, so as to implement an eye tracking function of VR glasses.

In some embodiments, the lens module 100 may further include a lens mount 102, a fixed lens element 103, a moveable lens element 104, an adjustment support 105, a lens element holder 106, and a lens barrel 107. The fixed lens element 103 and the moveable lens element 104 are configured to adjust an optical path of visible light entering the VR glasses, to implement folding of the optical path.

Figure 5:
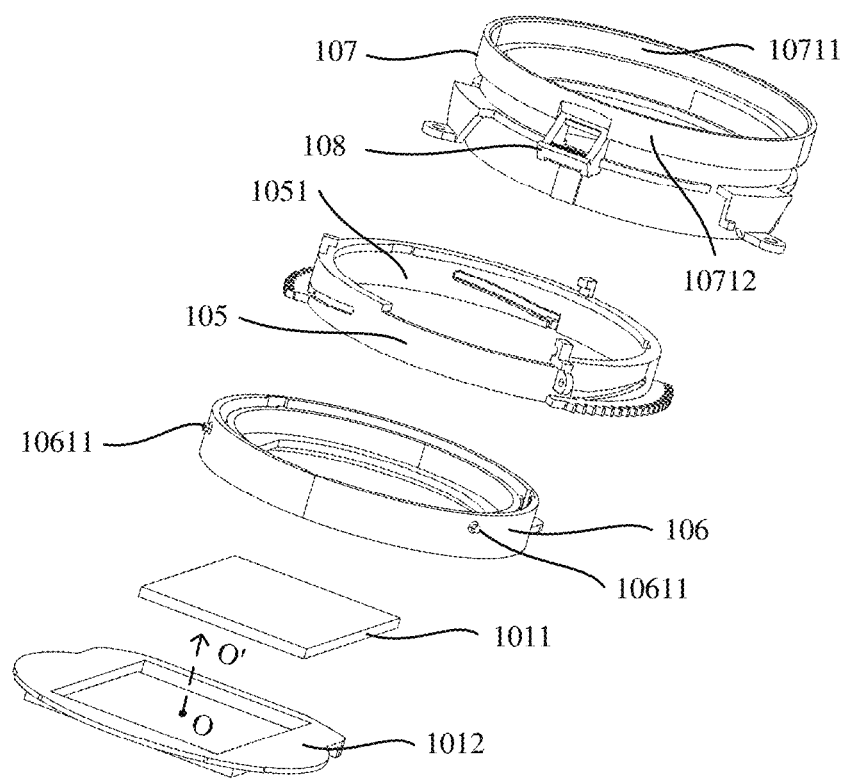
FIG. 5 is a diagram of disassembling some components of a lens module according to an embodiment of this application.
Figure 6:
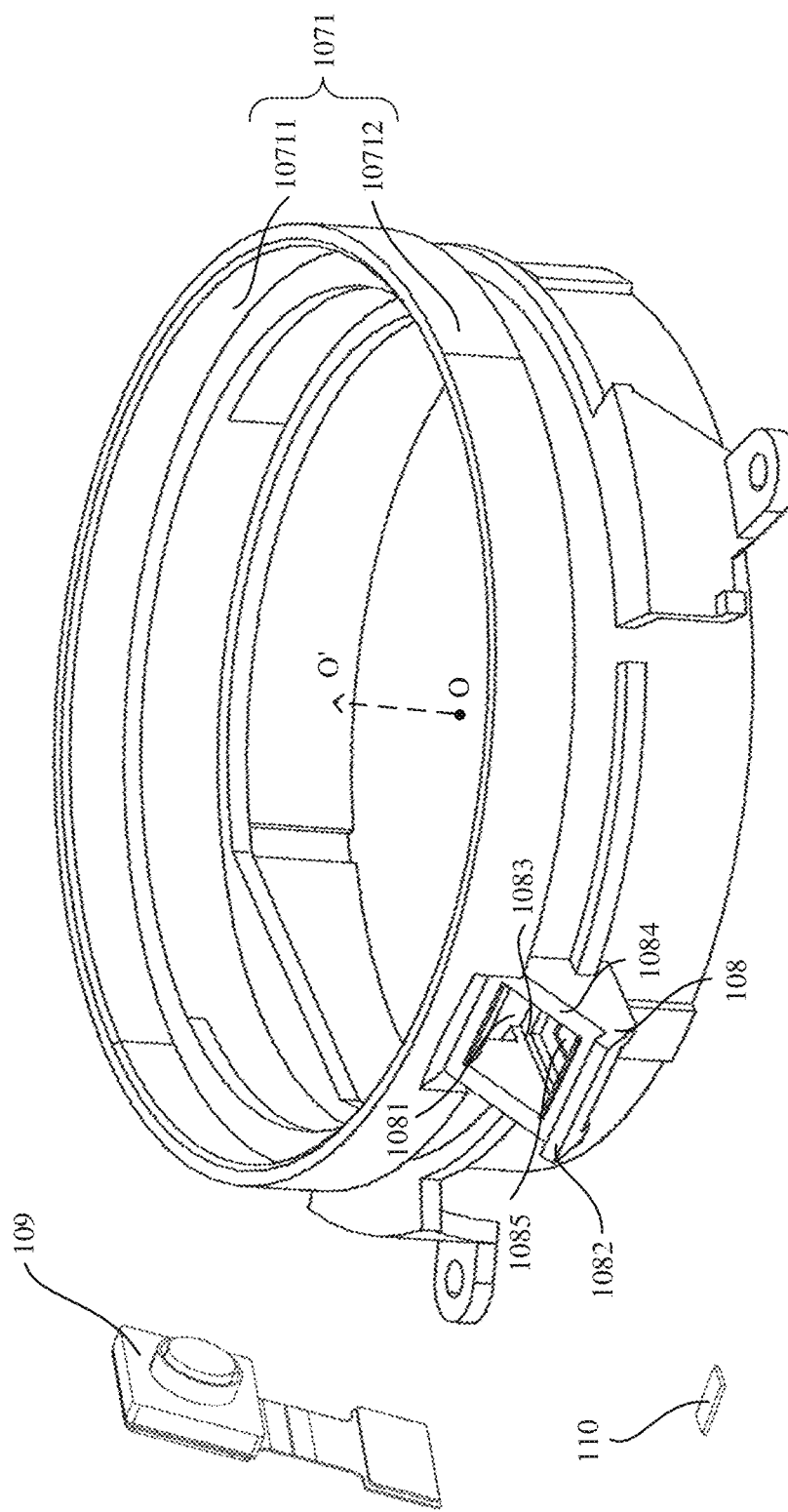
FIG. 6 is a structural diagram of components of a lens module according to an embodiment of this application.

Refer to FIG. 4 to FIG. 6. The lens barrel 107 is a support structure of the lens module 100. The lens barrel 107 includes a lens barrel wall 1071, and the lens barrel wall 1071 includes a lens barrel inner wall 10711 and a lens barrel outer wall 10712. A through hole 10713 is provided on the lens barrel wall 1071. In some embodiments, the through hole 10713 is an inner cavity opening of the lens barrel 107. The lens barrel inner wall 10711 communicates with the lens barrel outer wall 10712 through the through hole 10713. The lens barrel outer wall 10712 is connected to the mounting stage 108 at the through hole 10713. On one end that is of the lens barrel 107 and that is way from the lens mount 102, the lens element holder 106 is sleeved on the lens barrel outer wall 10712. The fixed lens element 103 and the moveable lens element 104 are disposed inside the lens barrel 107. The moveable lens element 104 is connected to the lens element holder 106, and is fastened to the lens element holder 106. The fixed lens element 103 is connected to the lens barrel inner wall 10711.

In some embodiments, one or more lens element supports are disposed inside the lens barrel 107, and the lens element support is connected to the lens barrel inner wall 10711. The fixed lens element 103 is connected to the lens barrel inner wall 10711 through the lens element support, and is fastened in the lens barrel 107.

In some embodiments, an axial direction of the lens barrel 107 may be an optical axis direction of a VR lens element (the fixed lens element 103 and the moveable lens element 104), and is represented by OO' in FIG. 4.

In some embodiments, the fixed lens element 103 may include one or more lens elements, and types of the plurality of fixed lens elements 103, such as curvatures, concave-convex shapes, and thicknesses, may be the same or different.

Figure 7:
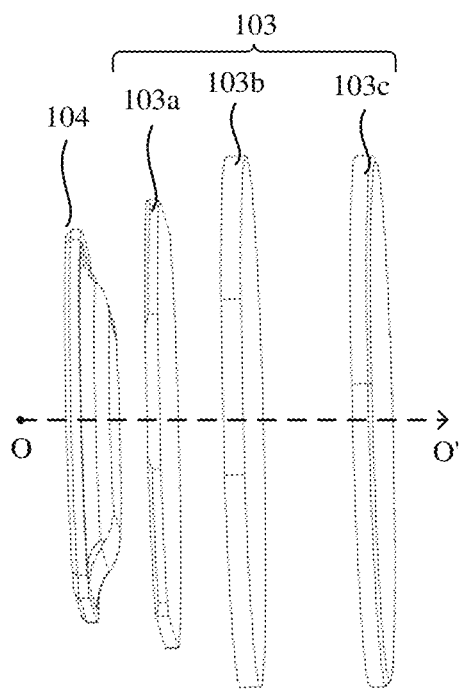
FIG. 7 is another structural diagram of components of a lens module according to an embodiment of this application.

In an embodiment, refer to FIG. 4 and FIG. 7. Three fixed lens elements 103 may be disposed in the lens barrel 107. A fixed lens element 103a is disposed away from the lens mount 102, a fixed lens element 103c is disposed near the lens mount 102, and a fixed lens element 103b is disposed between the fixed lens element 103a and the fixed lens element 103c. The through hole 10713 on the lens barrel wall 1071 or an inner cavity opening 10713 of the lens barrel 107 is located between the fixed lens element 103a and the fixed lens element 103b.

In some embodiments, the mounting stage 108 separately extends to the inner cavity of the lens barrel 107 at two ends of the inner cavity opening 10713 of the lens barrel 107, and forms lens element supports with extension parts that are in the inner cavity of the lens barrel and that are located on a same plane. The fixed lens element 103a and the fixed lens element 103b are respectively fastened in the lens barrel 107 by using the lens element supports.

Refer to FIG. 4 and FIG. 5. The lens element holder 106 is sleeved on an outer wall of the lens barrel 107, and is disposed away from and opposite to the lens mount 102, to fasten the moveable lens element 104. When the lens element holder 106 moves in the axial direction of the lens barrel 107, the moveable lens element 104 on the lens element holder 106 may be driven to move together, to change relative positions between the moveable lens element 104 and the fixed lens element 103 in the axial direction of the lens barrel 107. In this way, a diopter of the VR glasses is adjusted.

In some embodiments, the lens barrel 107 includes a fitting part. The fitting part is located at the other end that is of the lens barrel 107 and that is opposite to the light emitting unit 101. The lens element holder 106 is sleeved on the fitting part of the lens barrel 107, and may move along the fitting part in the axial direction of the lens barrel 107, to change relative positions between the moveable lens element 104 and the fixed lens element 103 in the axial direction of the lens barrel 107.

In some embodiments, one moveable lens element 104 or a plurality of moveable lens elements 104 may be disposed in the lens element holder 106.

Figure 8:
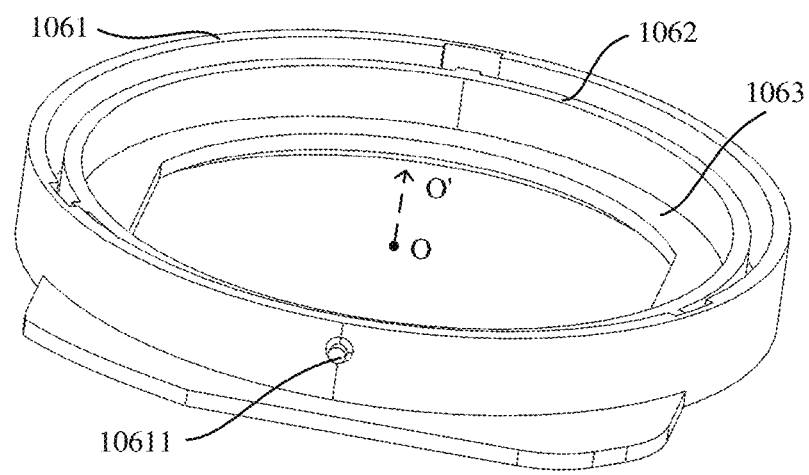
FIG. 8 is still another structural diagram of components of a lens module according to an embodiment of this application.

Refer to FIG. 8. The lens element holder 106 includes a first lens element holder wall 1061, a second lens element holder wall 1062, and a moveable lens element support 1063. The first lens element holder wall 1061 and the second lens element holder wall 1062 are separately connected to the moveable lens element support 1063 through a radial end face, and are fastened to the moveable lens element support 1063. The first lens element holder wall 1061 is located outside, and the second lens element holder wall 1062 is located inside. An opening is provided in the middle of the moveable lens element support 1063, and the moveable lens element 104 is fastened on the moveable lens element support 1063. A size of the opening on the moveable lens element support 1063 is related to an area of the moveable lens element 104. A larger area of the moveable lens element 104 indicates a larger opening on the moveable lens element support 1063. Visible light entering the VR glasses passes through the opening on the moveable lens element support 1063, and enters the lens barrel 107 through the moveable lens element 104. When the lens element holder 106 moves in the axial direction of the lens barrel 107, the moveable lens element 104 on the lens element holder 106 may move together. Therefore, relative positions between the moveable lens element 104 and the fixed lens element 103 in the axial direction of the lens barrel 107 change, and a focal length of the lens module 100 changes. In this way, diopter of the VR glasses is adjusted.

In some embodiments, both the first lens element holder wall 1061 and the second lens element holder wall 1062 are annular and are coaxially disposed opposite to each other. The first lens element holder wall 1061 is an outer ring, the second lens element holder wall 1062 is an inner ring, and a radius difference between the two rings is greater than a thickness of the lens barrel wall 1071. The first lens element holder wall 1061, the second lens element holder wall 1062, and the moveable lens element support 1063 connected between the first lens element holder wall 1061 and the second lens element holder wall 1062 form an annular slot. The fitting part of the lens barrel 107 is snapped into the annular slot, so that the lens element holder 106 is sleeved on the lens barrel wall 1071. One or more sliding blocks 10611 are disposed outside the first lens element holder wall 1061.

In an embodiment, the sliding blocks 10611 are cylindrical, three sliding blocks 10611 are disposed outside the first lens element holder wall 1061, and the three sliding blocks 10611 are evenly distributed around the axial direction of the lens barrel 107 in a circumferential direction of the first lens element holder wall 1061.

In some embodiments, the lens module 100 further includes a display assembly. The display assembly includes a display 11 and a display holder 112. The display 11 is fastened to the display holder 112. The display holder 112 is fastened to the lens element holder 106. Visible light emitted by the display 11 enters the lens barrel 107 through the moveable lens element 104, and is received by a human eye through the fixed lens element 103.

In some embodiments, the display assembly is fastened to the lens frame 200, and the lens module 100 includes no display assembly.

In some embodiments, a real image is displayed by using a projection optical engine, and the lens module 100 includes no display assembly.

Figure 9:
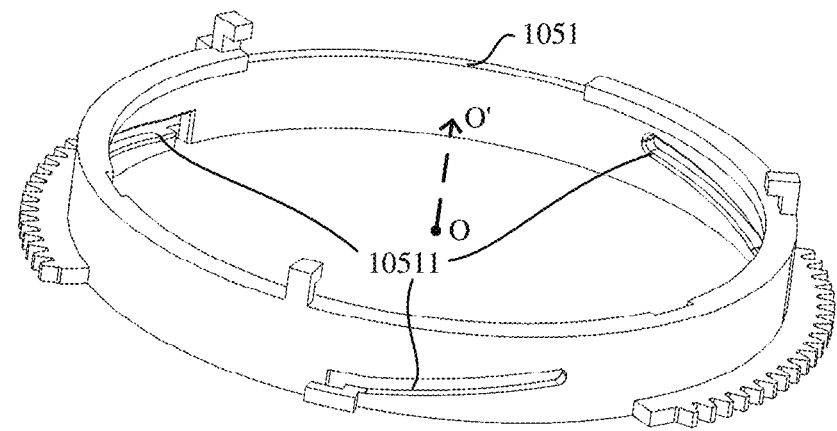
FIG. 9 is yet another structural diagram of components of a lens module according to an embodiment of this application.

Refer to FIG. 4, FIG. 5, and FIG. 9. The adjustment support 105 is sleeved outside the lens element holder 106, and is rotatably connected to the lens element holder 106. By rotating the adjustment support 105, the lens element holder 106 may be pushed to move in the axial direction of the lens barrel 107, to adjust a distance between the moveable lens element 104 and the fixed lens element 103 in the axial direction of the lens barrel 107, so as to achieve focus adjustment.

The adjustment support 105 includes an adjustment support wall 1051, where one or more guide rails 10511 are disposed on the adjustment support wall 1051, and the guide rails 10511 extend around a periphery of the lens barrel 107 in the axial direction of the lens barrel 107. In some embodiments, the guide rail 10511 is arc-shaped and extends in a circumferential direction of the adjustment support wall 1051. The guide rail 10511 penetrates an adjustment support inner wall 10512 and an adjustment support outer wall 10513 of the adjustment support wall 1051.

In an embodiment, the adjustment support wall 1051 is provided with three arc-shaped guide rails 10511. An end face at an end of the adjustment support 105 is provided with a notch, an end of a rail of the guide rail 10511 is connected to the notch on the end face of the adjustment support 105 and extends in the circumferential direction of the adjustment support wall 1051. The sliding block 10611 outside the lens element holder 106 may enter the rail of the guide rail 10511 from the notch, and the rail is internally smooth. When the sliding block 10611 slides along the rail of the guide rail 10511, the lens element holder 106 and the adjustment support 105 rotate relative to each other in the circumferential direction of the lens barrel 107, and also move relative to each other in the axial direction of the lens barrel 107. When the sliding block 10611 slides to the end of the rail, relative rotation angles of the adjustment support 105 and the lens element holder 106 in the circumferential direction of the lens barrel 107 and relative movement of the adjustment support 105 and the lens element holder 106 in the axial direction of the lens barrel 107 achieve maximum values. Rotation of the adjustment support 105 causes the sliding block 10611 to slide along the rail of the arc-shaped guide rail 10511, so that the moveable lens element 104 and the fixed lens element 103 are driven to move relative to each other in the axial direction of the lens barrel 107. In this way, a focal length of a VR lens element is changed, to adjust a diopter.

In some embodiments, an adjustment mechanism may alternatively be a threaded transmission structure or a gear transmission structure.

Refer to FIG. 6. The mounting stage 108 is connected to the lens barrel 107, and is fastened to the through hole 10713 on the lens barrel wall 1071. In some embodiments, the mounting stage 108 is located on the lens barrel outer wall 10712 of the lens barrel wall 1071 spaced between the light emitting unit 101 and the fitting part of the lens barrel.

The mounting stage 108 is hollow, and is configured to mount the eye camera 109 and hot mirror 110. The hot mirror 110 may be a convex mirror, a concave mirror, or a planar mirror.

In some embodiments, the hot mirror 110 is a convex mirror or a concave mirror, and a principal axis of the convex mirror or the concave mirror is parallel relative to the axial direction of the lens barrel 107.

In an embodiment, the hot mirror 110 is a planar mirror.

The mounting stage 108 includes an opening end 1081, an open end 1082, a cavity 1083, a first mounting surface 1084, and a second mounting surface 1085. An opening at the opening end 1081 corresponds to the through hole 10713 on the lens barrel wall 1071, that is, the cavity 1083 of the mounting stage 108 communicates with the inner cavity of the lens barrel at the inner cavity opening 10713.

The cavity 1083 is configured to connect the opening end 1081 to the open end 1082, and both the first mounting surface 1084 and the second mounting surface 1085 are planes. The first mounting surface 1084 is disposed on the open end 1082, and the eye camera 109 is disposed at an end that is of the mounting stage 108 and that is away from the lens barrel 107, and is connected to the first mounting surface 1084 to extend into the cavity 1083.

In some embodiments, the eye camera 109 faces away from the light emitting unit 101, an included angle between the first mounting surface 1084 and the axial direction of the lens barrel 107 is α, the eye camera 109 is mounted on the first mounting surface 1084, an optical axis of the eye camera 109 is inclined to the axial direction of the lens barrel 107, and an inclination angle is 90°−α.

It should be understood that, that the eye camera 109 faces away from the light emitting unit 101 means that a light incident surface of the eye camera 109 faces the other end that is of the lens barrel 107 and that is opposite to the light emitting unit 101 in the axial direction.

It should also be understood that an optical axis of the eye camera 109 is a symmetry axis of an optical system of the eye camera 109. A light beam rotates around the axis, and no optical characteristic changes.

In an embodiment, an included angle between the optical axis of the eye camera 109 and the axial direction of the lens barrel 107 is 20° to 70°.

The second mounting surface 1085 is disposed near the opening end 1081 and the through hole 10713, and the hot mirror 110 is fastened to the second mounting surface 1085. In some embodiments, an included angle between an optical axis of the hot mirror 110 and the axial direction of the lens barrel 107 is β, and β may be 0°. In other words, the hot mirror 110 and the fixed lens element 103 are mounted in parallel, and the hot mirror 110 is perpendicular relative to the axial direction of the lens barrel 107.

When the eye camera 109 is mounted on the mounting stage 108, infrared light reflected by the human eye may reach the eye camera 109 through the inner cavity of the lens barrel 107 and the hot mirror 110.

Figure 10:
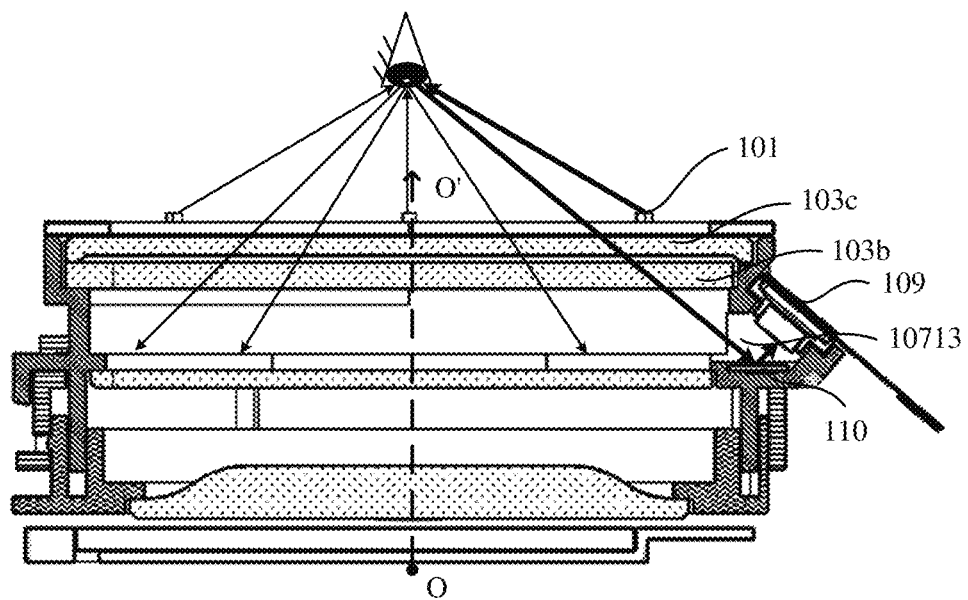
FIG. 10 is a diagram of an infrared optical path for implementing a human eye tracking function by a lens module according to an embodiment of this application.
Figure 11:
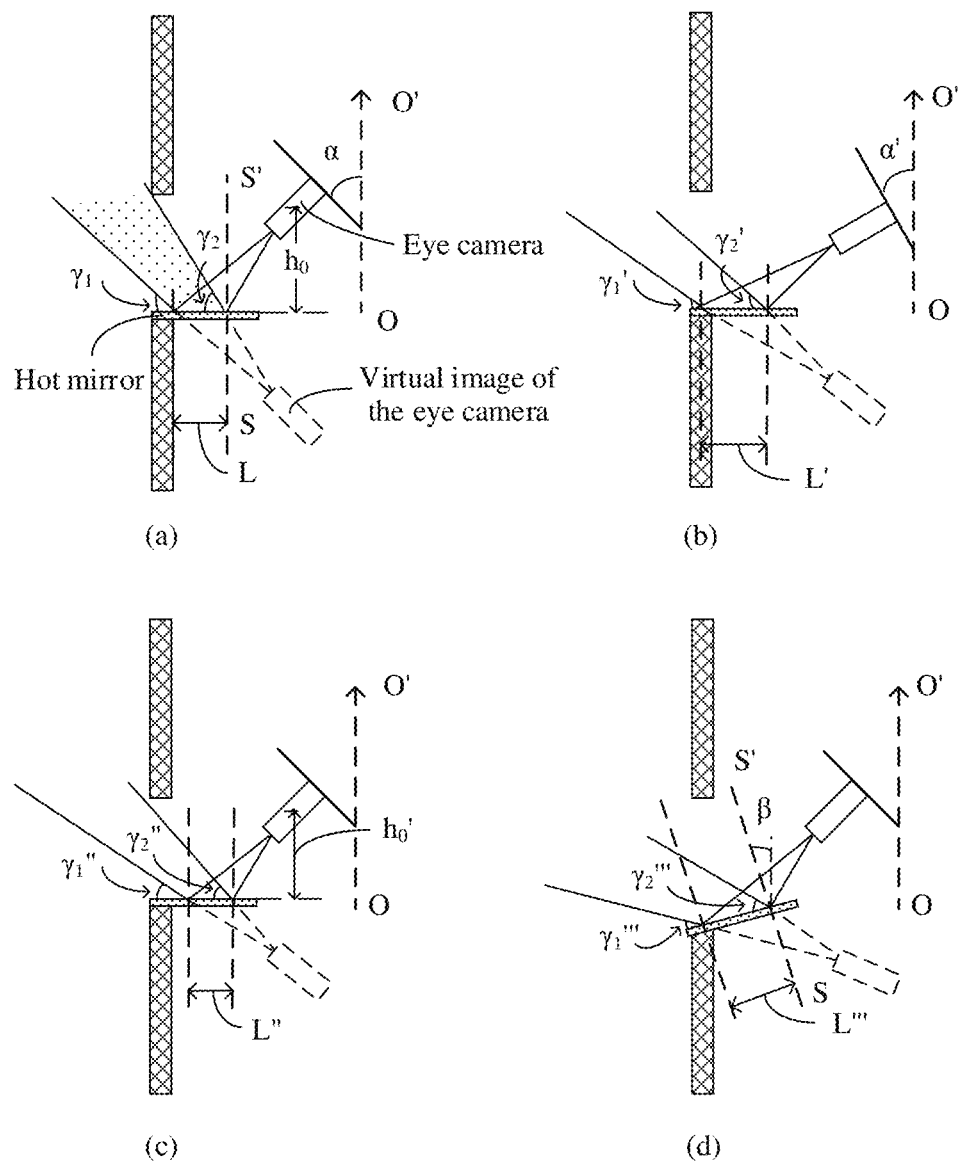
FIG. 11 is a diagram of a principle for implementing a human eye tracking function by a lens module according to an embodiment of this application.

FIG. 10 and FIG. 11 are diagrams of a principle of implementing eye tracking by the lens module shown in FIG. 3. The following describes an infrared optical path for implementing an eye tracking function in this embodiment with reference to FIG. 10 and FIG. 11.

Refer to FIG. 3 and FIG. 10. The lens mount 102 is disposed on the lens barrel 107, and the infrared light emitting unit 101 is disposed at an end of the lens barrel 107.

In some embodiments, the infrared light emitting unit 101 is an infrared light emitting diode (light emitting diode, LED).

In some embodiments, the infrared light emitting unit 101 is disposed on the lens mount 102.

In some embodiments, there are a plurality of infrared light emitting units 101.

In some embodiments, the plurality of infrared light emitting units 101 are evenly distributed around the axial direction of the lens barrel 107.

In some embodiments, the infrared light emitting units 101 are disposed at an equal distance on the lens mount 102.

In some embodiments, the infrared LED is attached to an outer ring of the fixed lens element 103c.

In an embodiment, the plurality of infrared light emitting units 101 are disposed on the lens mount 102 and are evenly distributed around the axial direction of the lens barrel 107. Infrared light emitted by a single infrared light emitting unit 101 is less incident to the human eye, and the infrared light emitting units 101 that are evenly distributed around the axial direction of the lens barrel facilitate incidence of infrared light in more directions to the human eye.

Refer to FIG. 10. Infrared light emitted by the infrared light emitting unit 101 is emitted into the human eye, and infrared light reflected by the human eye passes through the inner cavity opening 10713 of the lens barrel 107 after passing through the fixed lens element 103c and the fixed lens element 103b in the inner cavity of the lens barrel 107, and is incident to the hot mirror 110. After being reflected by the hot mirror 110, a part of the incident light may reach the eye camera 109.

Refer to FIG. 11(a). For an eye camera 109 with a fixed angle of view, when both the eye camera 109 and the hot mirror 110 are fixed, a shadow area in the figure is the angle of view of the eye camera 109. That is, an area formed between incident light whose incident angle is $\gamma_1$, incident light whose incident angle is $\gamma_2$, and the hot mirror 110 is the angle of view of the eye camera 109. When an incident angle, on the hot mirror 110, of the infrared light reflected by the human eye is between $\gamma_1$ and $\gamma_2$, and an incident point is in an area shown by L, an incident light ray is within the angle of view of the eye camera 109, and may be captured by the eye camera 109 after being reflected by the hot mirror 110. That is:

An incident angle θ, on the hot mirror 110, of infrared light that can be captured by the eye camera 109 (referred to as effective infrared light below) should be an effective incident angle.

$$\gamma_1 \leq \theta \leq \gamma_2$$

In addition, an incident point P, on the hot mirror 110, of the effective infrared light should be in the effective incident area.

$$P \in L$$

Refer to FIG. 11(b). In some embodiments, an inclination angle α of the first mounting surface 1084 is adjusted to α', boundary values $\gamma_1$ and $\gamma_2$ of the effective incident angle respectively change to $\gamma_1'$ and $\gamma_2'$, and the effective incident area L changes to L'. Therefore, a value range of the incident angle θ and a value range of the incident point P of the effective infrared light also change.

Refer to FIG. 11(c). In some embodiments, an axial distance between the eye camera 109 and the hot mirror 110 is adjusted from $h_0$ in FIG. 11(a) to $h_0'$, boundary values $\gamma_1$ and $\gamma_2$ of the effective incident angle respectively change to $\gamma_1''$ and $\gamma_2''$, and the effective incident area L changes to L''. Therefore, a value range of the incident angle θ and a value range of the incident point P of the effective infrared light also change.

Refer to FIG. 11(d). OO' is the axial direction of the lens barrel 107, and SS' is the optical axis of the hot mirror 110. In FIG. 11(a), the axial direction OO' of the lens barrel 107 is parallel to the optical axis SS' of the hot mirror 110, and an included angle β between OO' and SS' is 0°. In some embodiments, the optical axis SS' of the hot mirror 110 is inclined to the axial direction OO' of the lens barrel 107, and the included angle β between OO' and SS' is not 0°. In a process of adjusting β from 0° to β', the boundary values $\gamma_1$ and $\gamma_2$ of the effective incident angle respectively change to $\gamma_1'''$ and $\gamma_2'''$, and the effective incident area L changes to L'''. Therefore, a value range of the incident angle θ and a value range of the incident point P of the effective infrared light also change.

The inclination angle α of the first mounting surface 1084, relative positions of the hot mirror 110 and the eye camera 109 in the axial direction of the lens barrel 107, the included angle β between the optical axis of the hot mirror 110 and the axial direction of the lens barrel 107 are changed, so that an incident angle of infrared light that is incident to the hot mirror 110 is within an incident angle range of effective infrared light. This helps the eye camera 109 capture the infrared light reflected by the human eye, thereby achieving eye tracking.

By using the lens module 100 provided in this embodiment, the hot mirror 110 may be disposed outside internal space of the lens barrel 107, so that the internal space of the lens barrel 107 is saved, impact of the hot mirror on an imaging effect of the human eye via the lens module 100 is reduced, a display effect of the VR glasses 1000 is improved, and user experience is improved. In addition, the lens module 100 provided in this embodiment ensures that the VR glasses 1000 have a good dust-proof effect, and can be compatible with a nearsightedness focus adjustment structure.

Figure 12:
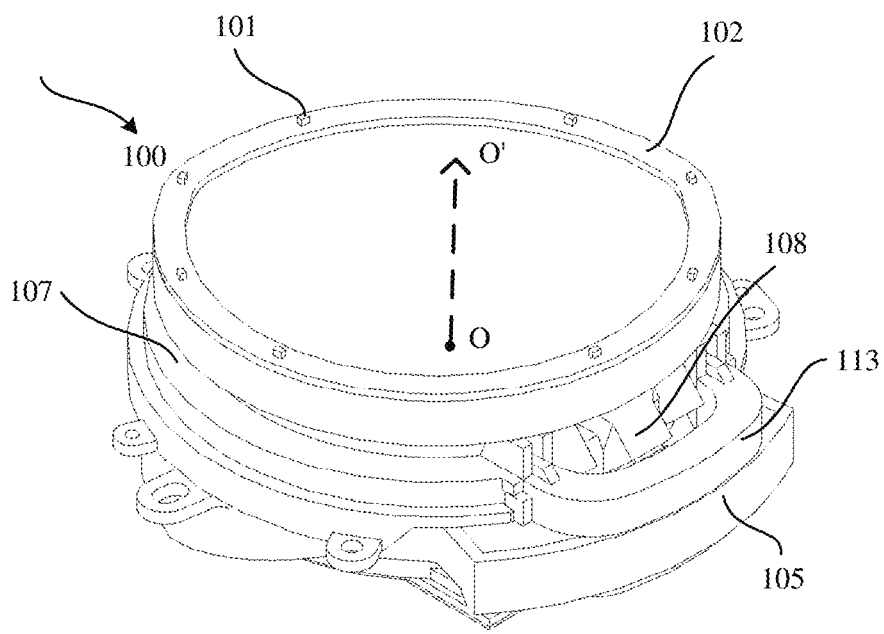
FIG. 12 is an isometrical diagram of another lens module according to an embodiment of this application.
Figure 13:
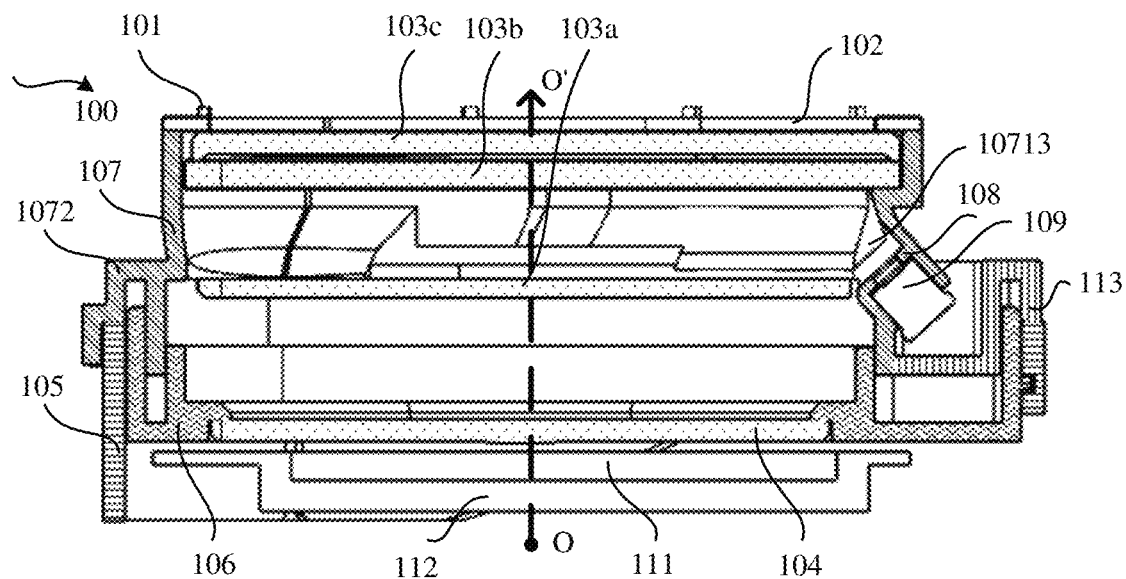
FIG. 13 is a diagram of a cross section of a lens module according to an embodiment of this application.

FIG. 12 is a diagram of a structure of another lens module according to an embodiment of this application. FIG. 13 is a sectional view of the lens module shown in FIG. 12, and FIG. 14 is a diagram of a plurality of components that form the lens module shown in FIG. 12.

A lens module 100 provided in embodiments of this application includes an infrared light emitting unit 101, a mounting stage 108, and an eye camera 109. The infrared light emitting unit 101 and the eye camera 109 are configured to implement a function of tracking a human eye. The infrared light emitting unit 101 is a light source and is configured to emit infrared light. The eye camera 109 is configured to: capture infrared light reflected by the human eye, parse the infrared light captured by the eye camera 209, and determine an action of the human eye, so as to implement a human eye tracking function of VR glasses.

In some embodiments, the lens module 100 further includes a lens mount 102, a fixed lens element 103, a moveable lens element 104, an adjustment support 105, a lens element holder 106, a lens barrel 107, and a sealing cover 113. The fixed lens element 103 and the moveable lens element 104 are configured to adjust an optical path of visible light entering the VR glasses, to implement folding of the optical path.

Figure 14:
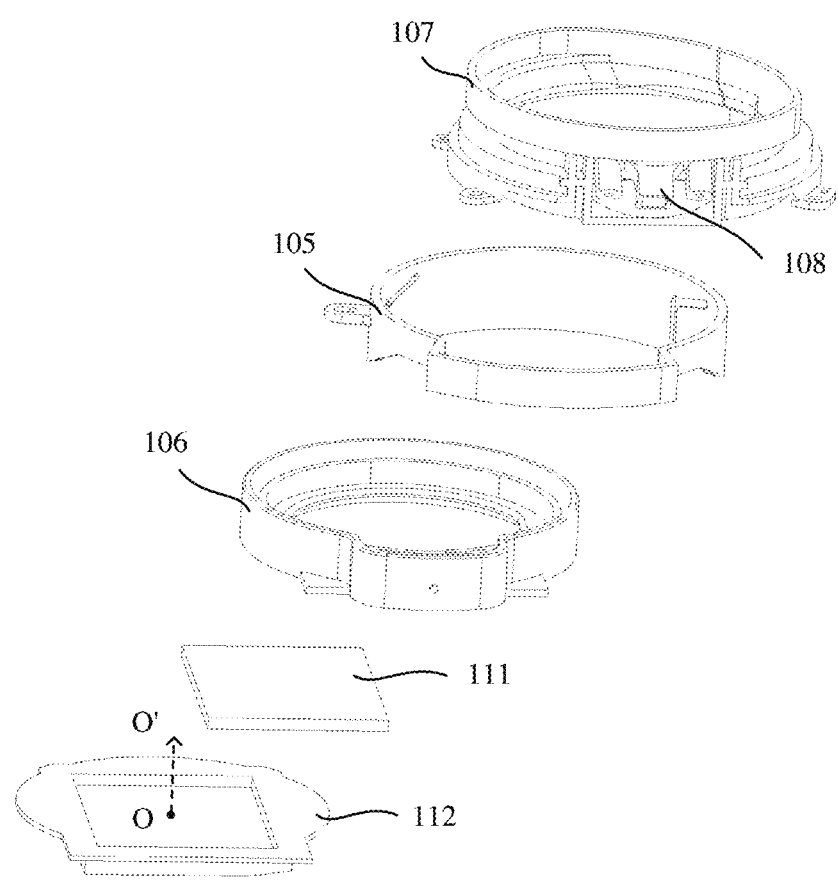
FIG. 14 is a diagram of disassembling some components of a lens module according to an embodiment of this application.
Figure 15:
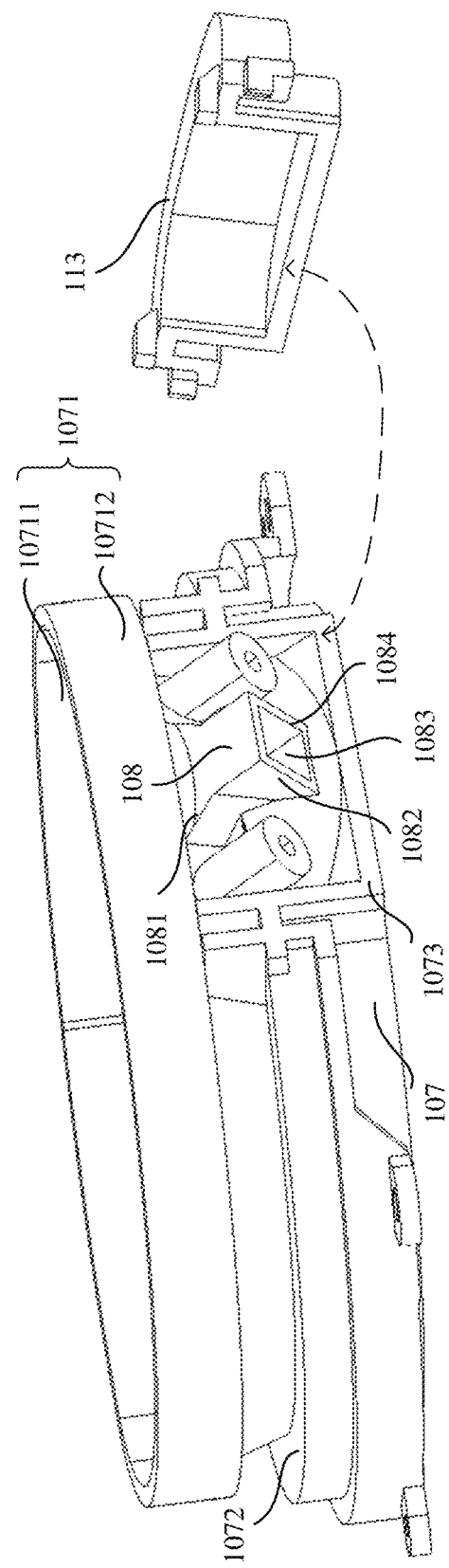
FIG. 15 is a structural diagram of components of a lens module according to an embodiment of this application.

Refer to FIG. 13 to FIG. 15. The lens barrel 107 is a support structure of the lens module 100. The lens barrel 107 includes a lens barrel wall 1071 and an outer edge 1072 of the lens barrel wall, and the lens barrel wall 1071 includes a lens barrel inner wall 10711 and a lens barrel outer wall 10712. The lens element holder 106 is sleeved on the lens barrel outer wall 10712.

In some embodiments, refer to FIG. 13. A cross section of the outer edge 1072 of the lens barrel wall includes a circumferential part and an axial part. The cross section of the outer edge 1072 of the lens barrel wall and a cross section of the lens barrel wall 1071 form a slot, and the slot extends in a circumferential direction of the lens barrel 107. That is, the outer edge 1072 of the lens barrel wall is connected to the lens barrel outer wall 10712, and forms an annular slot with the lens barrel wall 1071. A corresponding annular slot is provided on the lens element holder 106. The lens barrel wall 1071 is inserted into the annular slot of the lens element holder 106, so that the lens element holder 106 is sleeved on the lens barrel wall 1071.

A through hole 10713 is provided on the lens barrel wall 1071. In some embodiments, the through hole 10713 is an inner cavity opening of the lens barrel 107. The lens barrel inner wall 10711 communicates with the lens barrel outer wall 10712 through the through hole 10713. The lens barrel outer wall 10712 is connected to the mounting stage 108 at the through hole 10713. To avoid the mounting stage 108, the lens barrel 107 on the mounting stage 108 further includes a protruding window 1073, and the mounting stage 108 is located in the window 1073, and is fastened to the lens barrel outer wall 10712. One end of the window 1073 is fastened to the lens barrel outer wall 10712, and the other end of the window 1073 is open. The outer edge 1072 of the lens barrel wall is provided with a notch between two sides of the window 1073, and extends, on two edges of the notch, to an end face of an open end of the window 1073 in a length direction of the window 1073. On the two sides of the window 1073, the outer edge 1072 of the lens barrel wall respectively forms two slots with the two sides of the window 1073.

Refer to FIG. 15. The sealing cover 113 is a slot structure that is disposed corresponding to the window 1073 on the lens barrel 107. One end of the sealing cover 113 is open, and the other end of the sealing cover is closed. The sealing cover 113 is in a sealed connection to the window 1073, so that the sealing cover 113 and the window 1073 form a box body. The bottom of the box body is the bottom of the window 1073. Internal space of the box body is used to dispose the mounting stage 108 and the eye camera 109 mounted on the mounting stage 108. The bottom and the four walls of the box body may form a partition structure to partition a connection between the internal space of the box body and external space of the box body. This helps reduce a probability that dust, particles, and the like in the external space of the lens module 100 enter the internal space of the lens module 100 from the vicinity of the window 1073 of the lens barrel 107.

The fixed lens element 103 and the moveable lens element 104 are disposed inside the lens barrel 107. The moveable lens element 104 is connected to the lens element holder 106 and is fastened to the lens element holder 106. The fixed lens element 103 is fastened to the lens barrel inner wall 10711.

In some embodiments, the lens barrel inner wall 10711 is provided with one or more lens element supports, and the fixed lens element 103 is connected to the lens barrel inner wall 10711 by using the lens element support, and is fastened in the lens barrel 107.

In some embodiments, an axial direction of the lens barrel 107 may be an optical axis direction of a VR lens element (the fixed lens element 103 and the moveable lens element 104), and is represented by OO' in FIG. 13.

In some embodiments, the fixed lens element 103 may include one or more lens elements, and types of the plurality of fixed lens elements 103, such as curvatures, concave-convex shapes, and thicknesses, may be the same or different.

Figure 16:
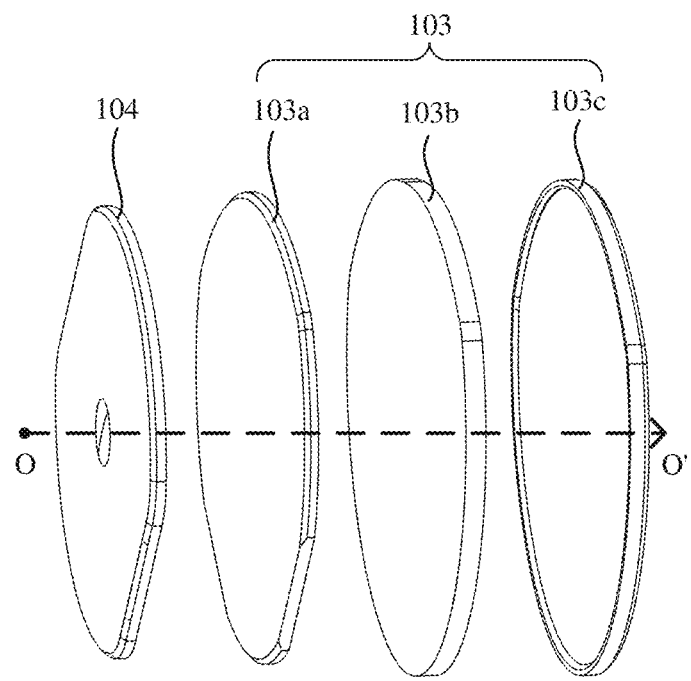
FIG. 16 is another structural diagram of components of a lens module according to an embodiment of this application.

In an embodiment, refer to FIG. 13 and FIG. 16. Three fixed lens elements 103 may be disposed in the lens barrel 107. A fixed lens element 103a is disposed away from the lens mount 102, a fixed lens element 103c is disposed near the lens mount 102, and a fixed lens element 103b is disposed between the fixed lens element 103a and the fixed lens element 103c. The through hole 10713 on the lens barrel wall 1071, namely, an inner cavity opening 10713 of the lens barrel 107 is located between the fixed lens element 103a and the fixed lens element 103b.

Figure 17:
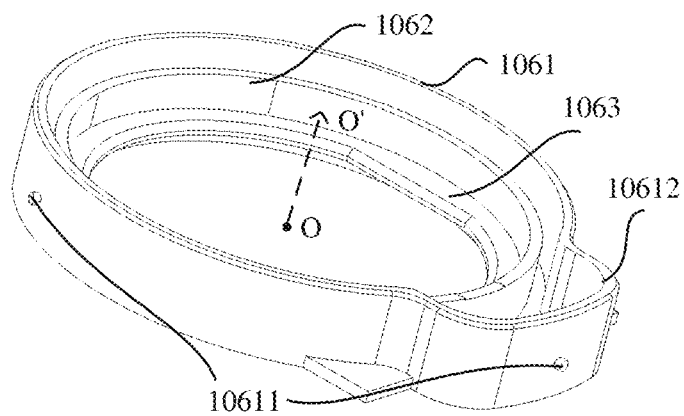
FIG. 17 is still another structural diagram of components of a lens module according to an embodiment of this application.

Refer to FIG. 13, FIG. 14, and FIG. 17. The lens element holder 106 is sleeved on the lens barrel outer wall 10712, and is disposed away from and opposite to the lens mount 102, to fasten the moveable lens element 104. When the lens element holder 106 moves in the axial direction of the lens barrel 107, the moveable lens element 104 on the lens element holder 104 may be driven to move together in the axial direction of the lens barrel 107, to change a relative distance between the moveable lens element 104 and the fixed lens element 103 in the axial direction of the lens barrel 107. In this way, a diopter of the VR glasses is adjusted.

In some embodiments, one moveable lens element 104 or a plurality of moveable lens elements 104 may be disposed in the lens element holder 106.

Refer to FIG. 17. The lens element holder 106 includes a first lens element holder wall 1061, a second lens element holder wall 1062, and a moveable lens element support 1063. The first lens element holder wall 1061 and the second lens element holder wall 1062 are separately connected to the moveable lens element support 1063 through an end face, and are fastened to the moveable lens element support 1063. The first lens element holder wall 1061 is located outside, and the second lens element holder wall 1062 is located inside. An opening is provided in the middle of the moveable lens element support 1063, and the moveable lens element 104 is fastened on the moveable lens element support 1063. A size of the opening on the moveable lens element support 1063 is related to an area of the moveable lens element 104. A larger area of the moveable lens element 104 indicates a larger opening on the moveable lens element support 1063. Visible light entering the VR glasses passes through the opening on the moveable lens element support 1063, and enters the lens barrel through the moveable lens element 104. When the lens element holder moves in the axial direction of the lens barrel 107, the moveable lens element 104 on the lens element holder 106 may accordingly move, to change relative positions between the moveable lens element 104 and the fixed lens element 103 in the axial direction of the lens barrel 107. In this way, a focal length of the lens module 100 is changed, and a diopter of the VR glasses is adjusted.

In some embodiments, both the first lens element holder wall 1061 and the second lens element holder wall 1062 are annular and are coaxially disposed. The first lens element holder wall 1061 further includes a first protrusion structure 10612, and the first protrusion structure 10612 is disposed corresponding to the window 1073 on the lens barrel 107. The first protrusion structure 10612 is snapped into the slots formed between the two sides of the window 1073 and the outer edge 1072 of the lens barrel wall. The sealing cover 113 covers the first protrusion structure 10612 and is in a sealed connection to the window 1073. One or more sliding blocks 10611 are disposed outside the first lens element holder wall 1061.

In an embodiment, three sliding blocks 10611 are disposed outside the first lens element holder wall 1061, and one of the sliding blocks 10611 is fastened outside the first protrusion structure 10612 of the first lens element holder wall 1061.

In some embodiments, the lens module 100 further includes a display assembly. The display assembly includes a display 111 and a display holder 112. The display 111 is fastened to the display holder 112. The display holder 112 is fastened to the lens element holder 106. Visible light emitted by the display 111 enters the lens barrel 107 through the moveable lens element 104, and is received by a human eye through the fixed lens element 103.

In some embodiments, the display assembly is fastened to the lens frame 200, and the lens module 100 includes no display assembly.

In some embodiments, a real image is displayed by using a projection optical engine, and the lens module 100 includes no display assembly.

Figure 18:
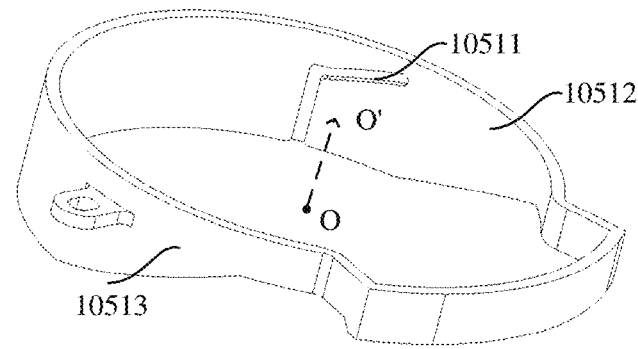
FIG. 18 is yet another structural diagram of components of a lens module according to an embodiment of this application.
Figure 18:
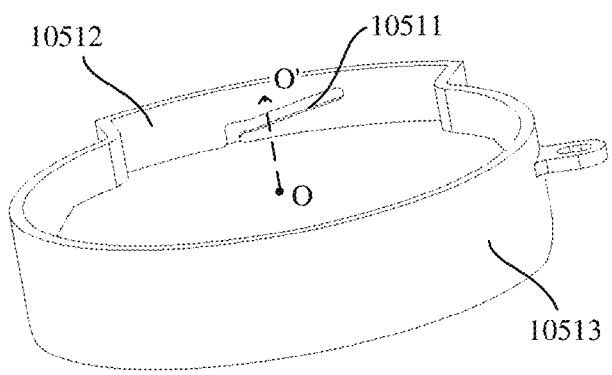

Refer to FIG. 13, FIG. 14, and FIG. 18. The adjustment support 105 is sleeved outside the lens element holder 106, and is rotatably connected to the lens element holder 106. By rotating the adjustment support 105, the lens element holder 106 may be pushed to move in the axial direction of the lens barrel 107, to adjust a distance between the moveable lens element 104 and the fixed lens element 103 in the axial direction of the lens barrel 107, so as to achieve focus adjustment.

Refer to FIG. 18. The adjustment support 105 includes an adjustment support inner wall 10512 and an adjustment support outer wall 10513. The adjustment support inner wall 10512 is provided with one or more guide rails 10511, and the guide rails 10511 extend around a periphery of the lens barrel 107 in the axial direction of the lens barrel 107.

In some embodiments, the adjustment support inner wall 10512 and the adjustment support outer wall 10513 are not connected at the guide rail 10511.

In some embodiments, the guide rail 10511 is of an "L" type. The guide rail 10511 includes a first rail and a second rail, where a direction of the first rail is parallel to the axial direction of the lens barrel 107, and the second rail extends in a circumferential direction of the adjustment support inner wall 10512.

In some embodiments, the first rail is smoothly connected to the second rail, and a protrusion is disposed at a joint, close to a side of the second rail, of the first rail and the second rail, so that a width of a rail at an entrance of the second rail is reduced. When the sliding block in the rail moves from the first rail to the second rail, the protrusion at the entrance of the second rail plays a role similar to an "entry", and therefore, the sliding block is not likely to slide into the first rail.

In some embodiments, the second rail is an arc-shaped guide rail, and the second rail extends from the joint of the first rail and the second rail in the circumferential direction of the adjustment support inner wall 10512. When the sliding block 10611 on the first lens element holder wall 1061 slides along the rail of the guide rail 10511, the lens element holder 106 moves in the axial direction of the lens barrel 107, and further rotates in the circumferential direction of the lens barrel 107. When the sliding block 10611 slides to the end of the guide rail 10511, relative rotation angles of the adjustment support 105 and the lens element holder 106 in the circumferential direction of the lens barrel 107 and a relative distance between the adjustment support 105 and the lens element holder 106 in the axial direction of the lens barrel 107 achieve maximum values.

In some embodiments, the adjustment support 105 is further provided with a second protrusion structure 1052 corresponding to the first protrusion structure 10612.

In an embodiment, the adjustment support inner wall 10512 is provided with three guide rails 10511, and the lens element holder 106 is provided with three sliding blocks. One guide rail 10511 is disposed on an inner wall of the second protrusion structure 1052, and one sliding block 10611 is correspondingly disposed on the first protrusion structure 10612. The sealing cover 113 covers the first protrusion structure 10612 and is separately in a sealed connection to the window 1073 and the second protrusion structure 1052.

The sliding block 10611 on the lens element holder 106 and the guide rail 10511 at a corresponding position on the adjustment support inner wall 10512 form a sliding guide rail structure, where the sliding block 10611 is a sliding block of the sliding guide rail structure, and the guide rail 10511 is a guide rail of the sliding guide rail structure. The sliding block 10611 moves along the first rail and slides into the second rail, and the adjustment support 105 is sleeved on the lens element holder 106. The adjustment support 105 is rotated, so that the sliding block 10611 moves along the second rail. A motion trajectory of the lens element holder 106 is similar to that of the sliding block 10611: rotating around the axial direction of the lens barrel 107 in the circumferential direction of the lens barrel 107, and moving in the axial direction of the lens barrel 107 in the axial direction of the lens barrel 107. A magnitude of displacement, in the axial direction of the lens barrel 107, of the lens element holder 106 is related to a size of a component of axial displacement of the lens barrel 107 generated when the sliding block 10611 moves along the second rail. A change of the distance between the fixed lens element 103 and the moveable lens element 104 causes a change of the focal length of the lens module 100. This implements adjustment of a diopter of the VR glasses.

In some embodiments, the adjustment support 105 may alternatively be a threaded transmission structure or a gear transmission structure.

Refer to FIG. 13 to FIG. 15. The mounting stage 108 is connected to the lens barrel 107, and is located in the window 1073 of the lens barrel 107. The mounting stage 108 is configured to mount the eye camera 109.

The mounting stage 108 is fastened to the through hole 10713 on the lens barrel wall 1071. The mounting stage 108 is hollow, and is configured to mount the eye camera 109. The mounting stage 108 includes an opening end 1081, an open end 1082, a cavity 1083, and a first mounting surface 1084. An opening at the opening end 1081 corresponds to the through hole 10713 on the lens barrel wall 1071, so that the cavity 1083 of the mounting stage 108 communicates with the inner cavity of the lens barrel 107 at the inner cavity opening 10713. The cavity 1083 is configured to connect the opening end 1081 to the open end 1082. The eye camera 109 is disposed at an end that is of the mounting stage 108 and that is away from the lens barrel 107, and extends into the cavity 1083. The eye camera faces the light emitting unit 101, and receives light from the human eye.

It should be understood that, that the eye camera 109 faces the light emitting unit 101 means that a light incident surface of the eye camera 109 faces an end that is of the lens barrel 107 and that is provided with the light emitting unit 101.

In some embodiments, the first mounting surface 1084 is disposed on the open end 1082, the first mounting surface 1084 is a plane, and the eye camera 109 is connected to the first mounting surface 1084 and extends into the cavity 1083. Light inside the lens barrel 107 may reach the eye camera 109 through the through hole 10713, the opening end 1081, and the cavity 1083.

In some embodiments, an included angle between the first mounting surface 1084 and the axial direction of the lens barrel 107 is a. When the eye camera 109 is mounted in the mounting stage 108 against the first mounting surface 1084, an optical axis of the eye camera 109 is inclined to the axial direction of the lens barrel 107, and an inclination angle is 90°−α.

Figure 19:
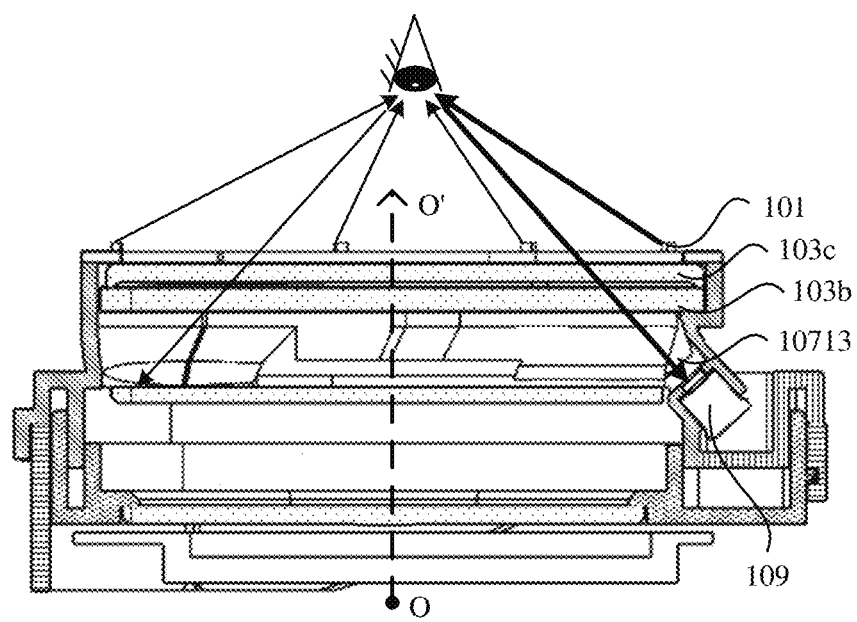
FIG. 19 is a diagram of an infrared optical path for implementing a human eye tracking function by a lens module according to an embodiment of this application.
Figure 20:
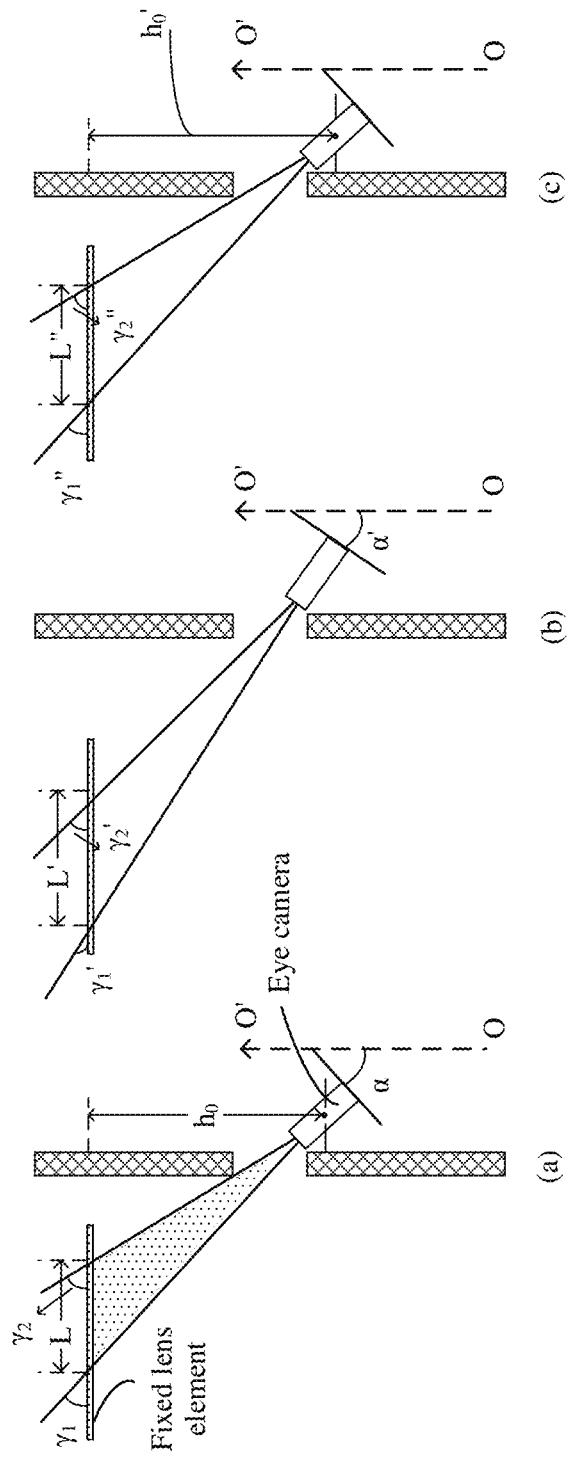
FIG. 20 is a diagram of a principle for implementing a human eye tracking function by a lens module according to an embodiment of this application.

FIG. 19 and FIG. 20 are diagrams of a principle of implementing eye tracking by the lens module shown in FIG. 12. The following describes an infrared optical path for implementing a human eye tracking function in this embodiment with reference to FIG. 19 and FIG. 20.

The infrared light emitting unit 101 is disposed at an end of the lens barrel 107. The lens mount 102 is connected to an end face of the lens barrel 107 at the rear end of the lens module 100.

In some embodiments, the infrared light emitting unit 101 is an infrared LED.

In some embodiments, the infrared light emitting unit 101 is disposed on the lens mount 102.

In some embodiments, there are a plurality of infrared light emitting units 101.

In some embodiments, the plurality of infrared light emitting units 101 are evenly distributed around the axial direction of the lens barrel 107.

In some embodiments, the infrared light emitting units 101 are disposed at an equal distance on the lens mount 102.

In an embodiment, the plurality of infrared light emitting units 101 are disposed on the lens mount 102 and are evenly distributed around the axial direction of the lens barrel 107. Infrared light emitted by a single infrared light emitting unit 101 is less incident to the human eye, and the infrared light emitting units 101 that are evenly distributed around the axial direction of the lens barrel facilitate incidence of infrared light in more directions to the human eye.

Refer to FIG. 19. Infrared light reflected by the human eye enters the eye camera 109 after passing through the fixed lens element 103c and the fixed lens element 103b.

Refer to FIG. 20(*a*). For an eye camera 109 with a fixed angle of view, when the eye camera 109 is fixed, a shadow area in the figure is the angle of view of the eye camera 109. That is, an area formed between incident light whose incident angle is $\gamma_1$, incident light whose incident angle is $\gamma_2$, and the fixed lens element 103 is the angle of view of the eye camera 109. When an incident angle, on the fixed lens element 103, of the infrared light reflected by the human eye is between $\gamma_1$ and $\gamma_2$, and an incident point is in an area shown by L, an incident light ray is within the angle of view of the eye camera 109, and may be captured by the eye camera 109. That is:

An incident angle θ, on the fixed lens element 103, of infrared light that can be captured by the eye camera 109 (referred to as effective infrared light below) should be an effective incident angle.

$$\gamma_1 \le \theta \le \gamma_2$$

In addition, an incident point P, on the fixed lens element 103, of the effective infrared light should be in the effective incident area.

$$P \in L$$

Refer to FIG. 20(b). In some embodiments, an inclination angle α of the first mounting surface 1084 is adjusted to a', boundary values $\gamma_1$ and $\gamma_2$ of the effective incident angle respectively change to $\gamma_1'$ and $\gamma_2'$, and the effective incident area L changes to L'. Therefore, a value range of the incident angle θ and a value range of the incident point P of the effective infrared light also change.

Refer to FIG. 20(c). In some embodiments, a distance, in the axial direction of the lens barrel 107, between the eye camera 109 and the fixed lens element 103 is adjusted from $h_0$ to $h_0'$, boundary values $\gamma_1$ and $\gamma_2$ of the effective incident angle respectively change to $\gamma_1''$ and $\gamma_2''$, and the effective incident area L changes to L''. Therefore, a value range of the incident angle θ and a value of the incident point P of the effective infrared light also change.

By changing the inclination angle α and the relative positions between the eye camera 109 and the fixed lens element 103c, an incident angle of infrared light that is incident to the fixed lens element 103 is an effective incident angle, and an incident point is in an effective incident area. This helps the eye camera 109 capture infrared light reflected by a human eye, thereby achieving eye tracking.

By using the lens module 100 provided in this embodiment, the hot mirror 110 does not need to be disposed in internal space of the lens barrel 107, so that the internal space of the lens barrel 107 is saved, impact of the hot mirror on the lens module 100 and an imaging effect of the human eye is reduced, a display effect of the VR glasses 1000 is improved, and user experience is improved. In addition, the lens module 100 provided in this embodiment ensures that the VR glasses 1000 have a good dust-proof effect, and can be compatible with a nearsightedness focus adjustment structure.

Figure 21:
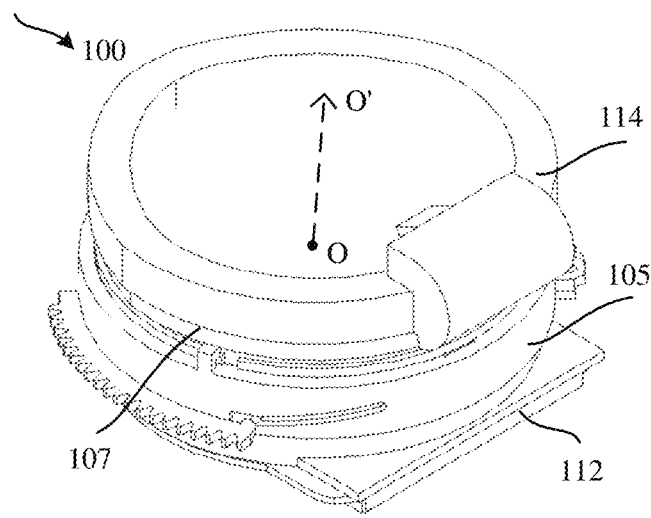
FIG. 21 is an isometrical diagram of still another lens module according to an embodiment of this application.
Figure 22:
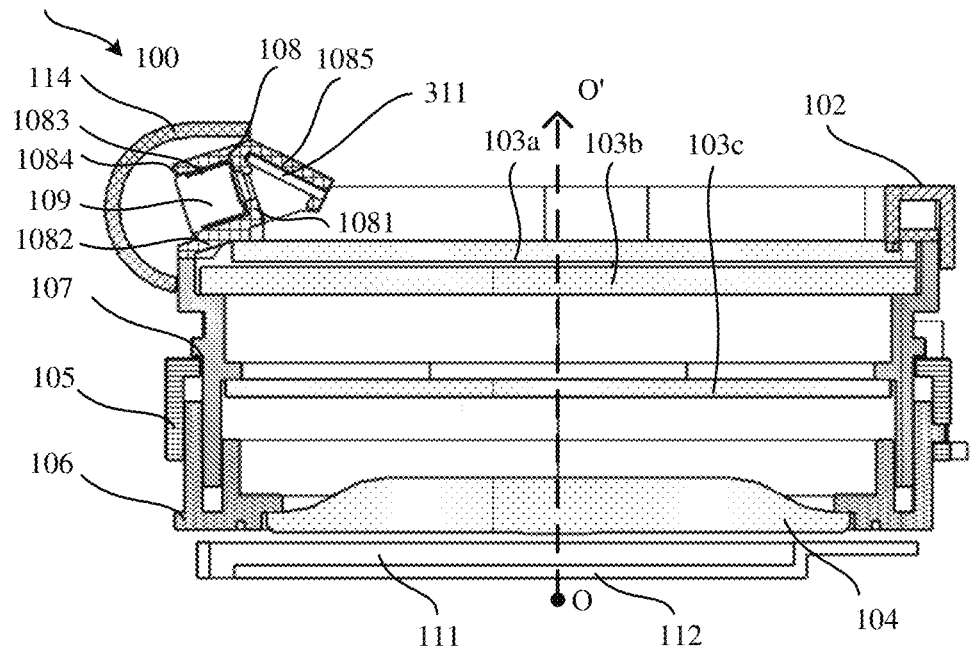
FIG. 22 is a diagram of a cross section of a lens module according to an embodiment of this application.

FIG. 21 is a diagram of still another lens module according to an embodiment of this application. FIG. 22 is a sectional view of the lens module shown in FIG. 21, and FIG. 23 to FIG. 28 are diagrams of a plurality of components that form the lens module shown in FIG. 21.

The lens module 100 provided in embodiments of this application includes an infrared light emitting unit 101, a lens mount 102, a mounting stage 108, and an eye camera 109. The infrared light emitting unit 101 and the eye camera 109 are configured to implement an eye tracking function. The infrared light emitting unit 101 is configured to emit infrared light for human eye tracking. The eye camera 109 is configured to: capture infrared light reflected by a human eye, parse the infrared light captured by the eye camera, and determine an action of the human eye, so as to implement a human eye tracking function of VR glasses.

In some embodiments, the lens module 100 further includes a fixed lens element 103, a moveable lens element 104, an adjustment support 105, a lens element holder 106, a lens barrel 107, and a transparent snap ring 114. The fixed lens element 103 and the moveable lens element 104 are configured to adjust an optical path of visible light entering the VR glasses, to implement folding of the optical path. The transparent snap ring 114 is configured to protect the eye camera 109 and the infrared light emitting unit 101.

In some embodiments, the lens module 100 may further include a hot mirror 110, and the hot mirror 110 is configured to adjust an optical path of the infrared light reflected by the human eye.

Figure 23:
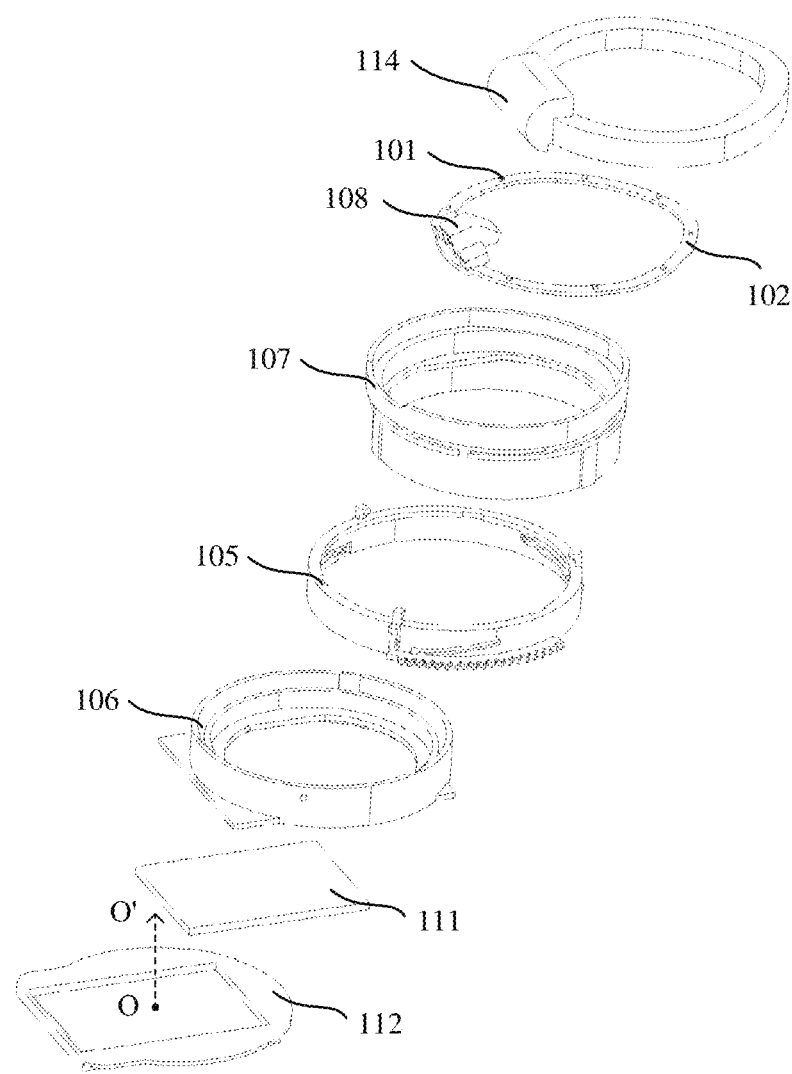
FIG. 23 is a diagram of disassembling some components of a lens module according to an embodiment of this application.

Refer to FIG. 22 and FIG. 23. The lens barrel 107 is a support structure of the lens module 100. The lens barrel 107 includes a lens barrel wall 1071, and the lens barrel wall 1071 includes a lens barrel inner wall 10711 and a lens barrel inner wall 10712. A lens element holder 106 is sleeved on the lens barrel outer wall 10712. A fixed lens element 103 and a moveable lens element 104 are disposed inside the lens barrel. The moveable lens element 104 is connected to the lens element holder 106 and is fastened to the lens element holder 106. The fixed lens element 103 is connected to the lens barrel inner wall 10712, and is fastened to the lens barrel inner wall 10712.

In some embodiments, the lens barrel inner wall 10712 is provided with one or more lens element supports, and the fixed lens element 103 is connected to the lens barrel inner wall 10712 by using the lens element support, and is fastened in the lens barrel.

In some embodiments, an axial direction of the lens barrel 107 may be an optical axis direction of a VR lens element (the fixed lens element and the moveable lens element), and is represented by OO' in FIG. 22.

In some embodiments, the fixed lens element 103 may include one or more lens elements, and types of the plurality of fixed lens elements 103, such as curvatures, concave-convex shapes, and thicknesses, may be the same or different.

Figure 24:
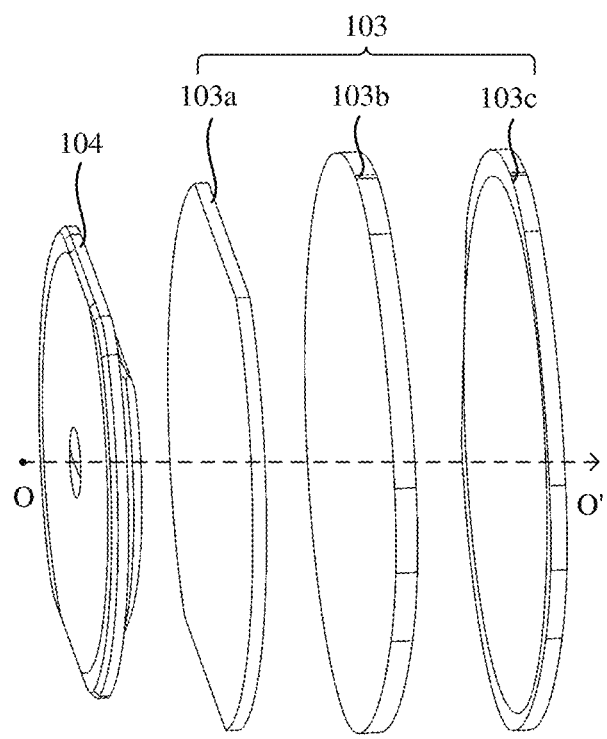
FIG. 24 is a structural diagram of components of a lens module according to an embodiment of this application.

Refer to FIG. 22 and FIG. 24. In an embodiment, three fixed lens elements 103 may be disposed in the lens barrel 107. A fixed lens element 103a is disposed away from the lens mount 102, a fixed lens element 103c is disposed near the lens mount 102, and a fixed lens element 103b is disposed between the fixed lens element 103a and the fixed lens element 103c.

Refer to FIG. 22 and FIG. 23. The lens element holder 106 is sleeved on an outer wall of the lens barrel 107, and is disposed away from and opposite to the lens mount 102, to fasten the moveable lens element 104. When the lens element holder 106 moves in the axial direction of the lens barrel 107, the moveable lens element 104 on the lens element holder 106 may move in the axial direction of the lens barrel 107, to change relative positions between the moveable lens element 104 and the fixed lens element 103 in the axial direction of the lens barrel 107. In this way, a focal length of the lens module 100 is changed, and a diopter of the VR glasses is adjusted.

In some embodiments, one moveable lens element 104 or a plurality of moveable lens elements 104 may be disposed in the lens element holder 106.

Figure 25:
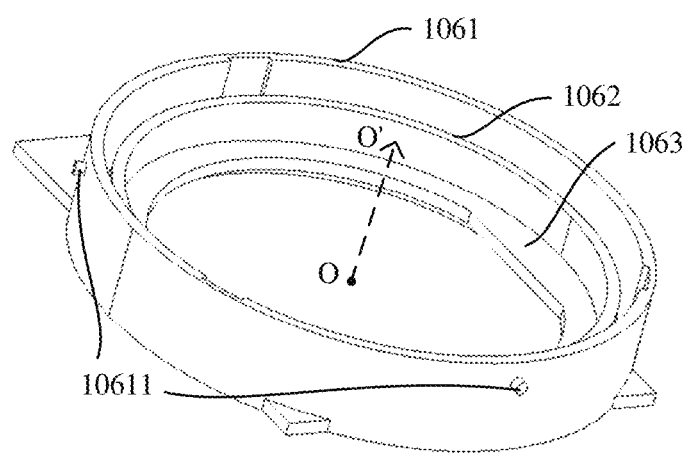
FIG. 25 is another structural diagram of components of a lens module according to an embodiment of this application.

Refer to FIG. 25. The lens element holder 106 includes a first lens element holder wall 1061, a second lens element holder wall 1062, and a moveable lens element 1063. The first lens element holder wall 1061 and the second lens element holder wall 1062 are separately connected to the moveable lens element 1063 through an end face, and are fastened to the moveable lens element 1063. The first lens element holder wall 1061 is located outside, and the second lens element holder wall 1062 is located inside. An opening is provided in the middle of the moveable lens element 1063, and the moveable lens element 104 is fastened on the moveable lens element support 1063. A size of the opening on the moveable lens element support 1063 is related to an area of the moveable lens element 104. A larger area of the moveable lens element 104 indicates a larger opening on the moveable lens element support 1063. Visible light entering the VR glasses passes through the opening on the moveable lens element support 1063, and enters the lens barrel 107 through the moveable lens element 104. When the lens element holder 106 moves in the axial direction of the lens barrel 107, the moveable lens element 104 on the lens element holder 106 may be driven to move together, to change relative positions between the moveable lens element 104 and the fixed lens element 103 in the axial direction of the lens barrel 107. In this way, a diopter of the VR glasses is adjusted.

In some embodiments, both the first lens element holder wall 1061 and the second lens element holder wall 1062 are annular and are coaxially disposed opposite to each other. The first lens element holder wall 1061 is an outer ring, the second lens element holder wall 1062 is an inner ring, and a radius difference between the two rings is greater than a thickness of the lens barrel wall. The first lens element holder wall 1061, the second lens element holder wall 1062, and the moveable lens element support 1063 connected between the first lens element holder wall 1061 and the second lens element holder wall 1062 form an annular slot. The lens barrel wall may be snapped into the annular slot, so that the lens element holder 106 is sleeved on the lens barrel wall. One or more sliding blocks 10611 are disposed outside the first lens element holder wall 1061.

In an embodiment, three sliding blocks 10611 are disposed outside the first lens element holder wall 1061, and the three sliding blocks 10611 are evenly distributed in a circumferential direction of the first lens element holder wall 1061.

In some embodiments, the lens module 100 further includes a display assembly. The display assembly includes a display 11 and a display holder 112. The display 11 is fastened to the display holder 112. The display holder 112 is fastened to the lens element holder 106. Visible light emitted by the display 11 enters the lens barrel 107 through the movable lens element, and is received by a human eye through the fixed lens element 103.

In some embodiments, the display assembly is fastened to the lens frame 200, and the lens module 100 includes no display assembly.

In some embodiments, a real image is displayed by using a projection optical engine, and the lens module 100 includes no display assembly.

Figure 26:
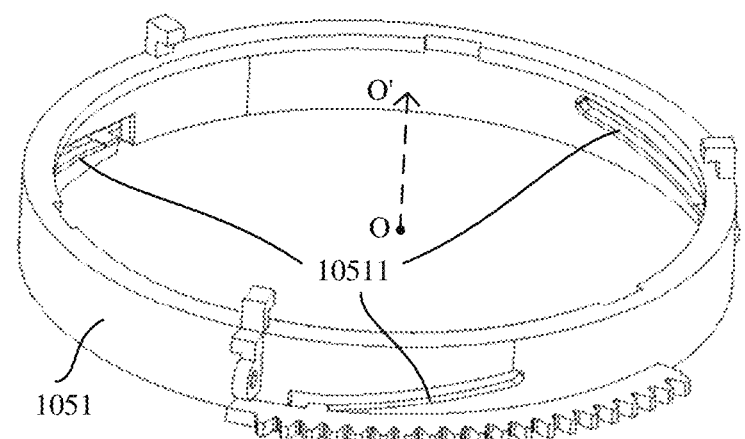
FIG. 26 is still another structural diagram of components of a lens module according to an embodiment of this application.

Refer to FIG. 22 and FIG. 26. The adjustment support 105 is sleeved outside the lens element holder 106, and is rotatably connected to the lens element holder 106. The lens element holder 106 may be pushed to move in the axial direction of the lens barrel 107 by rotating the adjustment support 105. In this way, the movable lens element 104 moves in the axial direction of the lens barrel 107, to adjust a distance between the movable lens element 104 and the fixed lens element 103 in the axial direction of the lens barrel 107, so as to achieve focus adjustment.

Refer to FIG. 26. The adjustment support 105 includes an adjustment support wall 1051, where one or more guide rails 10511 are disposed on the adjustment support wall 1051, and the guide rails 10511 extend around a periphery of the lens barrel 107 in the axial direction of the lens barrel 107.

In some embodiments, the guide rail 10511 is arc-shaped and extends in a circumferential direction of the adjustment support wall 1051. The guide rail 10511 penetrates inner and outer walls of the adjustment support wall 1051. A position of the guide rail 10511 corresponds to a position of the sliding block 10611 on the first lens element holder wall 1061.

In an embodiment, the adjustment support wall 1051 is provided with three arc-shaped guide rails 10511. An end face at an end of the adjustment support 105 is provided with a notch, an end of a rail of the guide rail 10511 is connected to the notch on the end face of the adjustment support 105. The sliding block 10611 may enter the rail of the guide rail 10511 from the notch, and the rail of the guide rail 10511 extends in the circumferential direction of the adjustment support wall 1051. The rail is internally smooth. When the sliding block 10611 slides along the rail of the arc-shaped guide rail 10511, the lens element holder 106 and the adjustment support 105 rotate relative to each other in the circumferential direction of the lens module 100, and also move relative to each other in the axial direction of the lens barrel 107. When the sliding block 10611 slides to the end of the arc-shaped guide rail 30811, relative rotation angles of the adjustment support 105 and the lens element holder 106 in the circumferential direction and a relative distance between the adjustment support 105 and the lens element holder 106 in the axial direction of the lens barrel 107 achieve maximum values.

The adjustment support 105 is rotated, so that the sliding block 10611 moves along the rail of the arc-shaped guide rail 10511. A motion trajectory of the lens element holder 106 is similar to that of the sliding block 10611: rotating around the axial direction of the lens barrel 107 in the circumferential direction of the lens barrel 107, and moving in the axial direction of the lens barrel 107 in the axial direction of the lens barrel 107. A magnitude of displacement, in the axial direction of the lens barrel 107, of the lens element holder 106 is related to a size of a component of axial displacement of the lens barrel 107 generated when the sliding block 10611 moves along the rail of the arc-shaped guide rail 10511. A change of the distance between the fixed lens element 103 and the movable lens element 104 causes a change of the focal length of a VR lens element. This implements adjustment of a diopter.

In some embodiments, the adjustment support 105 may alternatively be a threaded transmission structure or a gear transmission structure.

Figure 27:
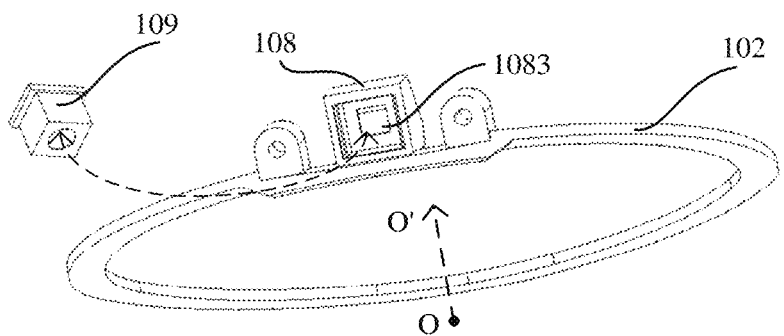
FIG. 27 is yet another structural diagram of components of a lens module according to an embodiment of this application.
Figure 28:
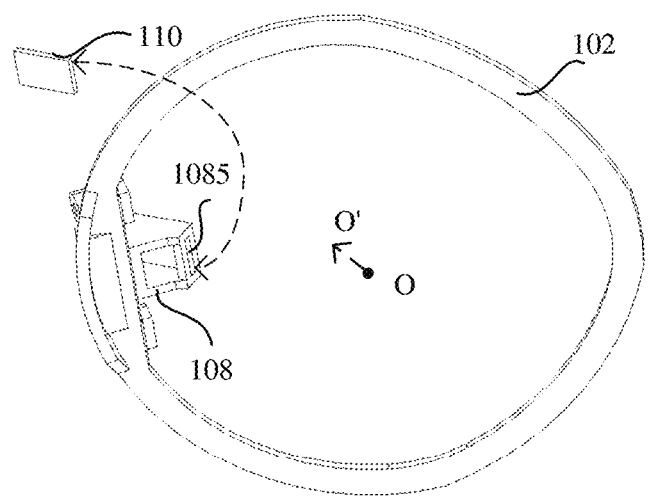
FIG. 28 is still yet another structural diagram of components of a lens module according to an embodiment of this application.

Refer to FIG. 27 and FIG. 28. The mounting stage 108 is connected to the lens mount 102. The mounting stage 108 is hollow. The mounting stage 108 includes an opening end 1081, an open end 1082, a cavity 1083, a first mounting surface 1084, and a second mounting surface 1085. The opening end 1081 is provided with an opening, and the open end 1082 is connected to the opening end 1081 through the cavity 1083.

Both the first mounting surface 1084 and the second mounting surface 1085 are planes. The eye camera 109 is disposed on a side that is of the mounting stage 108 and that is away from the axial direction of the lens barrel 107, and light from the infrared light emitting unit 101 is reflected and emitted into the eye camera through the human eye.

In some embodiments, the first mounting surface 1084 is disposed on the open end 1082, and the eye camera 109 is connected to the first mounting surface 1084 and extends into the cavity 1083. The eye camera 109 faces the human eye, and an optical axis of the eye camera 109 is inclined to the axial direction of the lens barrel 107.

It should be understood that, that the eye camera 109 faces the human eye means that a light incident surface of the eye camera 109 faces the human eye.

In some embodiments, an included angle between the first mounting surface 1084 and the axial direction of the lens barrel 107 is a, the eye camera 109 is mounted on the first mounting surface 1084, and an inclination angle of the optical axis of the eye camera 109 relative to the axial direction of the lens barrel 107 is 90°−α.

In an embodiment, an included angle between the optical axis of the eye camera 109 and the axial direction of the lens barrel is 45° to 90°.

The mounting stage 108 includes a body and a boss, and the boss extends from the body to an inner cavity of the lens barrel 107.

In some embodiments, the second mounting surface 1085 is disposed on the boss, and is configured to mount the hot mirror 110. The hot mirror 110 may be a convex mirror, a concave mirror, or a planar mirror.

In some embodiments, the hot mirror 110 is a convex mirror or a concave mirror, and a principal axis of the convex mirror or the concave mirror is inclined to the optical axis of the eye camera 109.

In an embodiment, the hot mirror 110 is a planar mirror, the hot mirror 110 is inclined to the optical axis of the eye camera 109, and an included angle between an optical axis of the hot mirror 110 on the second mounting surface 1085 and the axial direction of the lens barrel is β.

In some embodiments, a side that is of the mounting stage 108 and that is close to the inner cavity of the lens barrel 107 extends in the axial direction of the lens barrel 107, and forms a lens element support with the lens mount (102), and the fixed lens element 103 may be fastened in the lens barrel 107 through the lens element support.

In some embodiments, because a side that is of the mounting stage 108 and that is close to the inner cavity of the lens barrel 107 is inclined to the axial direction of the lens barrel 107, a closer proximity to the lens barrel inner wall 10711 indicates smaller space for accommodating the fixed lens element 103. A curvature near a side at which the fixed lens element 103 fastened through the lens element support is connected to the mounting stage 108 is reduced, so that the fixed lens element 103 may be mounted on the lens element support.

A transparent snap ring 114 is sleeved outside the lens mount 102, and the transparent snap ring 114 may be disposed outside the lens barrel 107, to protect elements such as the mounting stage 108, the eye camera, and the infrared light emitting unit 101. Light from the light emitting unit 101 is emitted into the human eye through the transparent snap ring 114. Infrared light that is incident to the hot mirror 110 may reach the eye camera 109 through the opening end 1081 and the cavity 1083.

Figure 29:
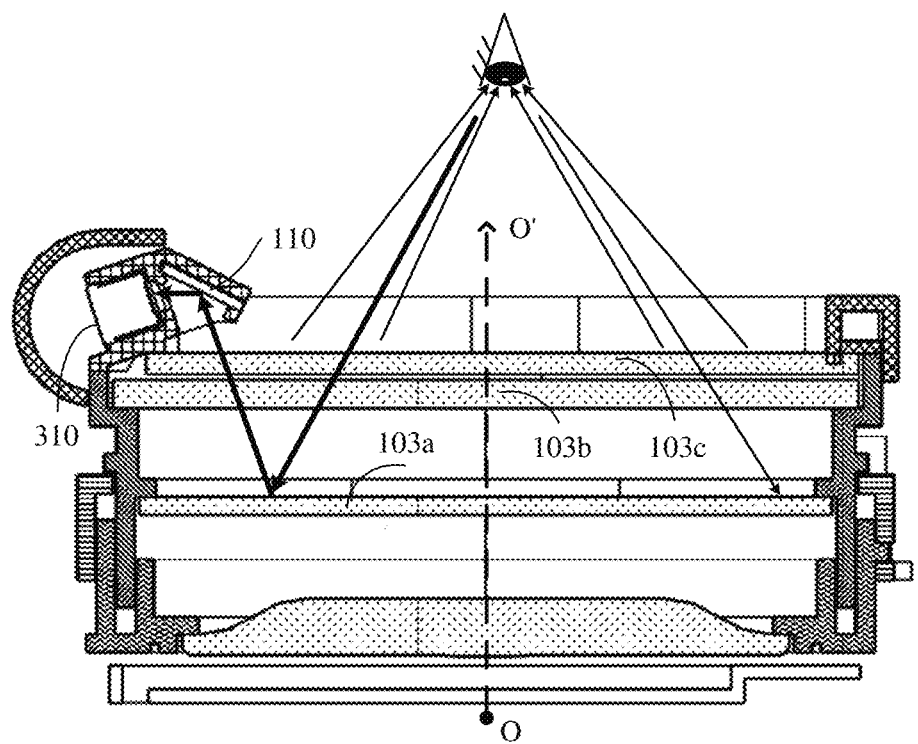
FIG. 29 is a diagram of an infrared optical path for implementing a human eye tracking function by a lens module according to an embodiment of this application.
Figure 30:
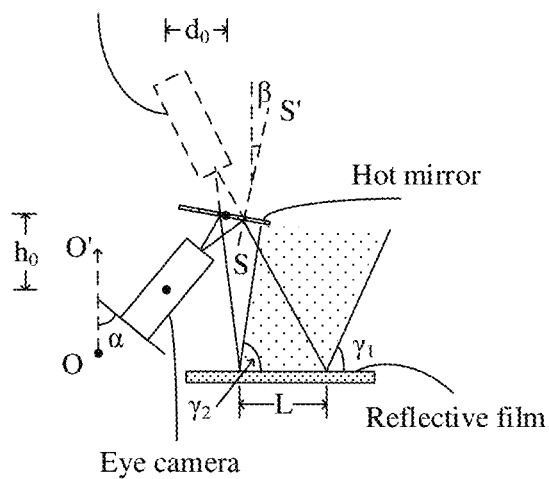
FIG. 30 is a diagram of a principle for implementing a human eye tracking function by a lens module according to an embodiment of this application.
Figure 30:
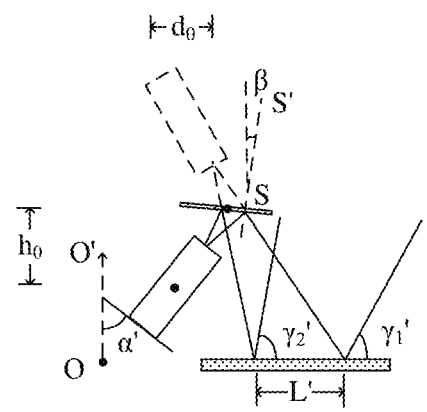
Figure 30:
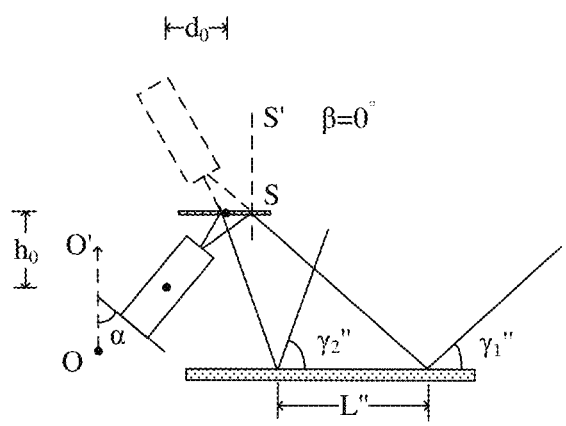
Figure 30:
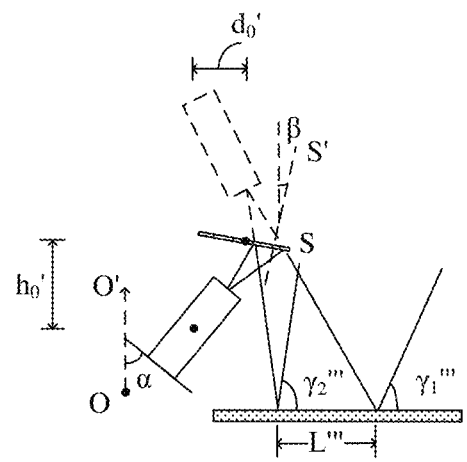

FIG. 29 and FIG. 30 are diagrams of a principle of implementing eye tracking by the lens module shown in FIG. 21. The following describes an infrared optical path for implementing a human eye tracking function in this embodiment with reference to FIG. 29 and FIG. 30.

Refer to FIG. 29. The lens mount 102 is disposed at an end of the lens barrel 107. The infrared light emitting unit 101 is disposed on a side (not marked) that is of the lens mount 102 and that is away from the lens barrel 107.

In some embodiments, the infrared light emitting unit 101 is an infrared LED.

In some embodiments, a plurality of infrared light emitting units 101 are disposed on the lens mount 102.

In some embodiments, a plurality of infrared light emitting units 101 are disposed at an equal distance on the lens mount 102.

In some embodiments, a plurality of infrared light emitting units 101 are disposed on the lens mount 102 and are evenly distributed around the axial direction of the lens barrel 107. Only a part of infrared light emitted by a single infrared light emitting unit 101 can enter the human eye, and the infrared light emitting units 101 that are disposed on the lens mount 102 and that are evenly distributed around the axial direction of the lens barrel 107 facilitate incidence of infrared light in more directions to the human eye.

After being emitted by the infrared light emitting unit 101, the infrared light is reflected by the human eye and enters the inner cavity of the lens barrel 107. In an embodiment, the infrared light reflected by the human eye enters the lens barrel 107, and reaches the fixed lens element 103a after passing through the fixed lens element 103c and the fixed lens element 103b. A reflective film that can reflect infrared light is coated on a surface at a near-eye side of the fixed lens element 103a. The infrared light reaching the fixed lens element 103a is incident to the hot mirror 110 after being reflected by the reflective film, and reaches the eye camera 109 after being reflected by the hot mirror 110.

Refer to FIG. 30. For an eye camera 109 with a fixed angle of view, when both the eye camera 109 and the hot mirror 110 are fixed, a shadow area in the figure is the angle of view of the eye camera 109. That is, an area formed between incident light whose incident angle is $\gamma_1$, incident light whose incident angle is $\gamma_2$, and the fixed lens element is the angle of view of the eye camera. When the infrared light reflected by the human eye is incident to the fixed lens element 103, an incident angle is between $\gamma_1$ and $\gamma_2$, and an incident point is in an area shown by L, an incident light ray is within the angle of view of the eye camera 109, reaches the hot mirror 110 after being reflected by the reflective film, and may be captured by the eye camera 109 after being reflected by the hot mirror 110. That is:

An incident angle θ, on the fixed lens element 103, of infrared light that can be captured by the eye camera 109 (referred to as effective infrared light below) should be an effective incident angle.

$$\gamma_1 \le \theta \le \gamma_2$$

In addition, an incident point P, on the fixed lens element 103a, of the effective infrared light should be in the effective incident area.

$$P \in L$$

Refer to FIG. 30. In some embodiments, an inclination angle α of the first mounting surface is adjusted to a', boundary values $\gamma_1$ and $\gamma_2$ of the effective incident angle respectively change to $\gamma_1'$ and $\gamma_2'$, and the effective incident area L changes to L'. Therefore, a value range of the incident angle θ and a value range of the incident point P of the effective infrared light also change.

Refer to FIG. 30. OO' is the axial direction of the lens barrel 107, and SS' is the optical axis of the hot mirror 110. In FIG. 30, the axial direction OO' of the lens barrel is inclined to the optical axis SS' of the hot mirror 110, and an included angle β between OO' and SS' is not 0°. In FIG. 30, the optical axis SS' of the hot mirror 110 is parallel to the axial direction OO' of the lens barrel 107, and the included angle β between OO' and SS' is 0°. In a process of adjusting β from non-0° to 0° in FIG. 30, the boundary values $\gamma_1$ and $\gamma_2$ of the effective incident angle respectively change to $\gamma_1'''$ and $\gamma_2'''$, and the effective incident area L changes to L'''. Therefore, a value range of the incident angle θ and a value range of the incident point P of the effective infrared light also change.

Refer to FIG. 30. An axial distance between the eye camera 109 and the hot mirror 110 is adjusted from $h_0$ in FIG. 30 to $h_0'$, or a radial distance between the eye camera 109 and the hot mirror 110 is adjusted from $d_0$ in FIG. 30 to $d_0'$, boundary values $\gamma_1$ and $\gamma_2$ of the effective incident angle respectively change to $\gamma_1''$ and $\gamma_2''$, and the effective incident area L changes to L''. Therefore, a value range of the incident angle θ and a value of the incident point P of the effective infrared light also change.

The inclination angle α, relative positions of the hot mirror 110 and the eye camera 109, the included angle β between the optical axis of the hot mirror 110 and the axial direction of the lens barrel 107 are changed, so that an incident angle of infrared light that is incident to the hot mirror 110 is within an incident angle range of effective infrared light. This helps the eye camera 109 capture the infrared light reflected by the human eye, thereby achieving eye tracking.

Figure 31:
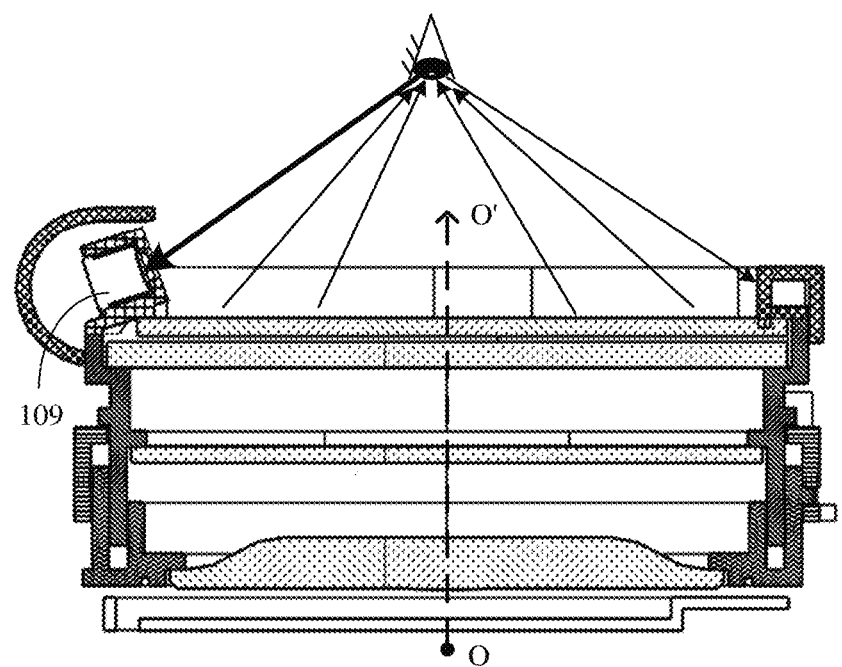
FIG. 31 is a diagram of an infrared optical path for implementing a human eye tracking function by another lens module according to an embodiment of this application.

Refer to FIG. 31. The lens module 100 provided in this embodiment may include no hot mirror 110. FIG. 31 is a diagram of an infrared optical path for eye tracking by the lens module 100 that includes no hot mirror 110. Adjusting an inclination angle α helps an eye camera capture infrared light reflected by a human eye, so as to track a human eye.

By using the lens module 100 provided in this embodiment, the hot mirror 110 does not need to be disposed in internal space of the lens barrel 107, so that the internal space of the lens barrel 107 is saved, impact of the hot mirror on the lens module 100 and an imaging effect of the human eye is reduced, a display effect of the VR glasses 1000 is improved, and user experience is improved. In addition, the lens module 100 provided in this embodiment ensures that the VR glasses 1000 have a good dust-proof effect, and can be compatible with a nearsightedness focus adjustment structure.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A lens module, comprising:
   a light emitting unit;
   a lens barrel comprising a fitting part, wherein the light emitting unit is disposed at one end of the lens barrel, and the fitting part is located at a second end of the lens barrel opposite to the light emitting unit;
   an eye camera;
   a hollow mounting stage connected to the lens barrel, wherein a cavity of the hollow mounting stage is connected to an inner cavity of the lens barrel, wherein an optical axis of the eye camera is inclined to an axial direction of the lens barrel, and wherein the eye camera is disposed at an end of the hollow mounting stage that is away from the lens barrel, and wherein the eye camera extends into the cavity; and
   a lens element holder sleeved on the fitting part and configured to move along the fitting part in the axial direction of the lens barrel, and wherein the hollow mounting stage is located on a lens barrel outer wall of the lens barrel, the lens barrel outer wall being spaced between the light emitting unit and the fitting part.

2. The lens module according to claim 1, wherein the eye camera is configured to receive light from the light emitting unit that passes through the inner cavity of the lens barrel after being reflected by a human eye.

3. The lens module according to claim 2, wherein the lens module further comprises:
   a fixed lens element comprising a first fixed lens element and a second fixed lens element, an inner cavity opening of the lens barrel is located between the first fixed lens element and the second fixed lens element, and the cavity of the hollow mounting stage is connected to the inner cavity of the lens barrel at the inner cavity opening.

4. The lens module according to claim 1, wherein:
   the eye camera faces away from the light emitting unit, the lens module further comprises a mirror reflector, and the mirror reflector is disposed in the cavity or disposed at a joint between the cavity and the inner cavity of the lens barrel; and
   the light received from the light emitting unit is incident to the mirror reflector through the inner cavity of the lens barrel, and light reflected by the mirror reflector is emitted into the eye camera.

5. The lens module according to claim 4, wherein an included angle between the optical axis of the eye camera and the axial direction of the lens barrel is 20° to 70°.

6. The lens module according to claim 5, wherein the mirror reflector is a planar mirror reflector, a concave mirror reflector, or a convex mirror reflector.

7. The lens module according to claim 6, wherein:
   the mirror reflector is the planar mirror reflector, the planar mirror reflector is disposed vertically to the axial direction of the lens barrel; or
   the mirror reflector is the concave mirror reflector or the convex mirror reflector, and a principal axis of the concave mirror reflector or the convex mirror reflector is disposed in parallel with the axial direction of the lens barrel.

8. The lens module according to claim 7, further comprising:
   an adjustment support sleeved on the lens element holder and rotatably connected to the lens element holder, wherein the adjustment support is configured to push the lens element holder to move in the axial direction of the lens barrel.

9. The lens module according to claim 8, wherein the adjustment support is provided with a guide rail, the guide rail extends around a periphery of the lens barrel in the axial direction of the lens barrel, an outer wall of the lens element holder is provided with a sliding block, and when the sliding block slides in the guide rail, the lens element holder is configured to move in the axial direction of the lens barrel and rotate in a circumferential direction of the lens barrel.

10. A lens module, comprising:
    a light emitting unit;
    a lens mount;
    a lens barrel comprising a fitting part, wherein the lens mount is disposed at a first end of the lens barrel, and the light emitting unit is disposed on a side of the lens mount that is away from the lens barrel, and the fitting part is located at a second end of the lens barrel opposite to the lens mount;
    an eye camera; and
    a hollow mounting stage connected to the lens mount, wherein an optical axis of the eye camera is inclined to an axial direction of the lens barrel, and wherein the eye camera is disposed on a side of the hollow mounting stage that is away from the lens barrel, and wherein the eye camera extends into a cavity; and
    a lens element holder sleeved on the fitting part and configured to move along the fitting part in the axial direction of the lens barrel, and wherein the hollow mounting stage is located on a lens barrel outer wall of the lens barrel, the lens barrel outer wall being spaced between the light emitting unit and the fitting part.

11. The lens module according to claim 10, wherein the eye camera is configured to receive light from the light emitting unit that is reflected by a human eye.

12. The lens module according to claim 11, further comprising:
a first fixed lens element and a mirror reflector, wherein the first fixed lens element is fastened in the lens barrel, and a surface of the first fixed lens element that is adjacent to the lens mount has a reflective film disposed thereon, wherein the hollow mounting stage comprises a body and a boss, the boss extends from the body to an inner cavity of the lens barrel, the body comprises the cavity, the eye camera is disposed in the cavity of the body, the mirror reflector is disposed on the boss, the mirror reflector is disposed facing a fixed lens element, and the mirror reflector is inclined to the optical axis of the eye camera; and
the light from the light emitting unit is emitted into an emitting film after being reflected by the human eye, light reflected by the reflective film is incident to the mirror reflector, and light reflected by the mirror reflector is emitted into the eye camera.

13. The lens module according to claim 12, wherein the mirror reflector is:
a planar mirror reflector inclined to the optical axis of the eye camera; or
a concave or convex mirror reflector having a principal axis inclined to the optical axis of the eye camera.

14. The lens module according to claim 13, wherein:
the first fixed lens element is disposed at the second end in the lens barrel that is away from the lens mount; and
the lens module further comprises an adjustment support, wherein adjustment support is rotatably connected to the lens element holder, and is configured to adjust a position of the lens element holder in the axial direction of the lens barrel.

15. The lens module according to claim 14, wherein an included angle between the optical axis of the eye camera and the axial direction of the lens barrel is 45° to 90°.

16. The lens module according to claim 15, wherein the lens module further comprises a transparent snap ring, the transparent snap ring is disposed outside the lens barrel, and the light from the light emitting unit is emitted into the human eye through the transparent snap ring.

17. The lens module according to claim 16, wherein:
a side of the hollow mounting stage that is adjacent to the inner cavity of the lens barrel extends in the axial direction of the lens barrel and forms a lens element support with the lens mount; and
the lens module further comprises the first fixed lens element, and the first fixed lens element is fastened in the lens barrel by the lens element support.

18. A head-mounted electronic device, comprising a lens frame and the lens module according to claim 10, wherein the lens module is disposed on the lens frame.

19. A head-mounted electronic device, comprising:
a lens frame; and
a lens module on the lens frame, wherein the lens module comprises:
a light emitting unit;
a lens barrel comprising a fitting part, wherein the light emitting unit is disposed at one end of the lens barrel, and the fitting part is located at a second end of the lens barrel opposite to the light emitting unit;
an eye camera;
a hollow mounting stage connected to the lens barrel, wherein a cavity of the hollow mounting stage is connected to an inner cavity of the lens barrel, wherein an optical axis of the eye camera is inclined to an axial direction of the lens barrel, and wherein the eye camera is disposed at an end of the hollow mounting stage that is away from the lens barrel, and wherein the eye camera extends into the cavity; and
a lens element holder sleeved on the fitting part and configured to move along the fitting part in the axial direction of the lens barrel, and wherein the hollow mounting stage is located on a lens barrel outer wall of the lens barrel, the lens barrel outer wall being spaced between the light emitting unit and the fitting part.

* * * * *